United States Patent
Sakai et al.

(10) Patent No.: US 7,236,636 B2
(45) Date of Patent: Jun. 26, 2007

(54) IMAGE COMPRESSION METHOD, IMAGE RESTORATION METHOD, PROGRAM AND APPARATUS

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 11/038,603

(22) Filed: Jan. 21, 2005

(65) Prior Publication Data

US 2005/0123206 A1    Jun. 9, 2005

Related U.S. Application Data

(63) Continuation of application No. PCT/JP03/00888, filed on Jan. 30, 2003.

(51) Int. Cl.
  *G06K 9/30* (2006.01)
  *G06K 9/68* (2006.01)

(52) U.S. Cl. .................. 382/238; 382/232; 382/222

(58) Field of Classification Search ............... 382/222, 382/232, 233, 238, 239; 358/1.15
See application file for complete search history.

(56) References Cited

U.S. PATENT DOCUMENTS

| 5,777,749 A | 7/1998 | Noda et al. | 382/239 |
| 2003/0123087 A1 | 7/2003 | Sakai et al. | 358/1.15 |

FOREIGN PATENT DOCUMENTS

| JP | 54-2619 | 1/1979 |
| JP | 3-171875 | 7/1991 |
| JP | 8-51545 | 2/1996 |
| JP | 9-149263 | 6/1997 |
| JP | 9-294210 | 11/1997 |
| JP | 2003-189108 | 7/2003 |
| JP | 2003-198855 | 7/2003 |
| JP | 2003-198856 | 7/2003 |

OTHER PUBLICATIONS

International Search Report for corresponding application PCT/JP03/00888 mailed Apr. 1, 2003.

*Primary Examiner*—Duy M. Dang
(74) *Attorney, Agent, or Firm*—Staas & Halsey LLP

(57) ABSTRACT

An image compression divides an input image into blocks having the predetermined number of horizontal and longitudinal pixels, and scans the divided blocks in a main scan direction and a sub scan direction so as to select them in order as a processing block, and selects as a reference block a block in which positional relation with the selected block and a relation of a pixel value satisfies a predetermined condition. Subsequently, the pixel values of the processing block and the reference block are subjected to an exclusive-OR (XOR) so as to generate a differential image, and in case the differential image satisfies the predetermined condition, the processing block is replaced with the differential image. Further, the image including the differential image obtained by executing the block replacement in the processing block is encoded, and the code data obtained by executing this image encoding, the presence or absence of replacement with the differential image of each processing block obtained by executing the block replacement, and positional information of the reference block are combined and outputted. The image decoding is executed in such way that the image including the differential image from the code data is decoded, and this decoded image is decoded into the original image by an exclusive-OR with the processing block which is divided into blocks and the reference block.

16 Claims, 28 Drawing Sheets

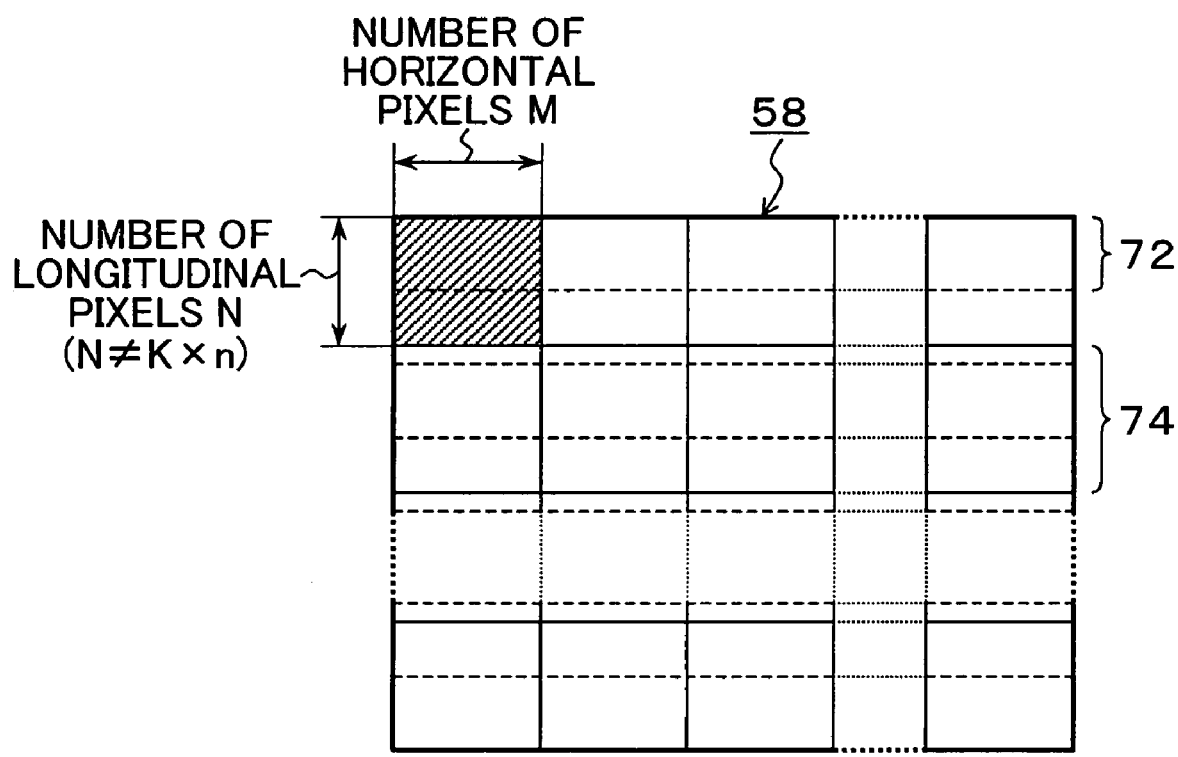

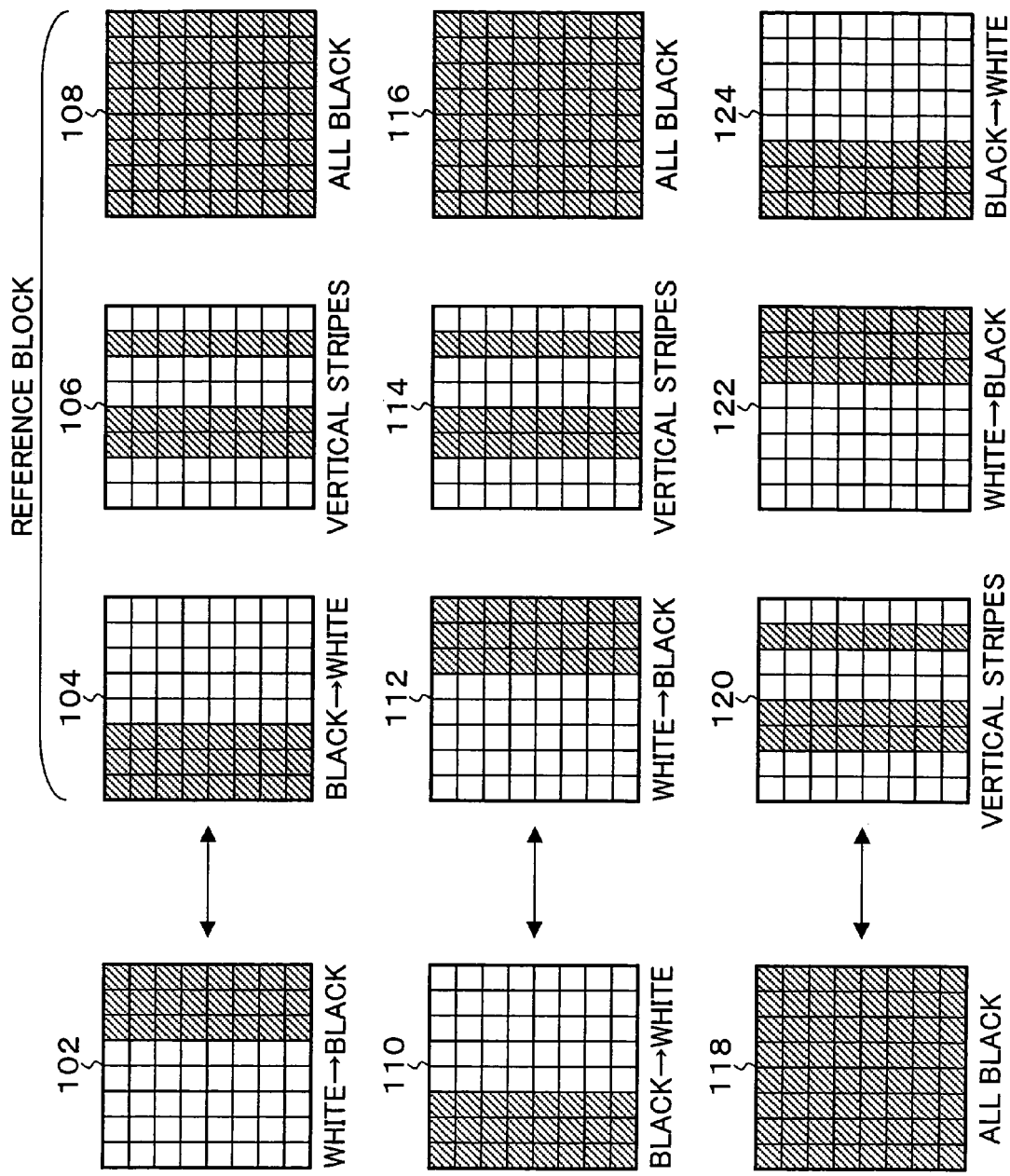

IMAGE COMPRESSION METHOD, IMAGE RESTORATION METHOD, PROGRAM AND APPARATUS

This application is a continuation of PCT/JP03/00888, filed Jan. 30, 2003.

BACKGROUND OF THE INVENTION

1. Field of the Invention

The present invention relates to an image compression method, an image restoration method, a program and an apparatus which compress a bit-mapped image so as to be transferred to a printer and the like, and after that, to be restored, and in particular, it relates to an image compression method, an image restoration method, a program and an apparatus which are capable of super-compressing an image change such as a gradation.

2. Description of the Related Art

In recent years, in general, an information technology device such as a personal computer and the like has become widespread, and has come to be used for various purposes. Particularly, there has been often the case where an image processing is performed by the PC, and a variety of processing has been performed where a printer is connected by the PC to print an image or an image data is transferred through a network such as an Internet and the like. However, the more complicated the image becomes, the more it takes time to transfer the image data from the PC to the printer or to transfer the image data through the network. Thus, it is desired that an image data be compressed and transferred. Hence, in case a bit-mapped image is directly transferred to a printer having no font and a printing is performed, the image data is compressed, so that an amount of the data to be transmitted is reduced, thereby saving a transferring time. In this case, though there are colored and gray scale data in the image data, a compressing method of a binarized bit-mapped image which binarizes these image data will be described below.

As for the conventional compressing method of the binarized bit-mapped image, there are MH (Modified Huffman), MR (Modified Read), MMR (Modified Modified READ), JBIG (Joint Bi-Level Image Experts Group) and the like, which are widely used for a FAX communication and an image filing.

Since these compressing methods are in heavy use of the bit processing and are not suitable for high speed encoding processing, the [compressing method of bit mapped-data and the compressing apparatus thereof] aiming at high speed processing has been proposed (by Japanese Patent Application Publication No. 3278298). According to this image compressing method, there is a problem that, while a bit-map mainly composed of characters can be effectively compressed, on the other hand, the compression efficiency of the dithered image is low. Hence, the present inventor has proposed a compressing method (Japanese Patent Application Laid-Open Publication No. 2001-388931), which enhances the compression efficiency of a uniform dithered image in which the same patterns continuously appear repeatedly.

However, the compression method proposed by the present inventor has caused a problem that, while the uniform dithered image in which the form of the pattern does not change but repeats itself can be effectively compressed, on the other hand, the dithered image in which the form of the pattern continuously changes similarly to the gradation cannot be compressed at all.

DISCLOSURE OF THE INVENTION

An object of present invention is to provide an image compression method, an image restoration method, a program and an apparatus, which enhance the compression efficiency of a dithered image which continuously changes in the form of a pattern.

(Compression Method)

The present invention provides the image compression method, and is characterized by comprising:

a dividing step of dividing an inputted image into blocks having the predetermined number of horizontal and longitudinal pixels by a block dividing unit;

a processing block selecting step of scanning the divided blocks in a main scan direction and a sub scan direction by a processing block selecting unit so as to be selected in order as processing blocks;

a reference block selecting step of selecting as a reference block a block, in which a positional relation with the block selected at the processing block selecting step and a relation of a pixel value satisfies a predetermined condition by the reference block selecting unit;

a differential image generating step of generating a differential image by subjecting the pixel values of the processing block and the reference block to an exclusive-OR operation (XOR) by a differential image generating unit; and a block replacing step of replacing the processing block with the differential image in case the differential image satisfies a predetermined condition by a block replacing unit.

Further, the image compression method of the present invention is characterized by comprising:

an image encoding step of encoding the image obtained by executing the block replacing step by an image encoding unit; and an output step of combining and outputting a code data obtained by executing the image encoding step, the presence or absence of replacement with the differential image of each processing block obtained by executing the block displacing step, and the positional information of the reference block by a code output unit.

In this way, the present invention, as a pre-processing for encoding an image at the image encoding step, divides the image into blocks having horizontal and longitudinal pixels (N×M), and subjects each block with the neighborhood block to the exclusive-OR (XOR) and reduces the number of black pixels to be encoded within the image, thereby enhancing the compression efficiency. That is, when the exclusive-OR (XOR) is applied to the pixel values between blocks so as to generate the differential image, the portion in which the pixel values of the same positions of both blocks are different, that is, the portion which becomes a white pixel versus a black pixel or the black pixel versus the white pixel remains only as the black pixel. Hence, in the case of the dithered image in which the form of the pattern continuously changes similarly to the gradation, the higher the correlation of the pixel values between the neighborhood blocks is, the smaller the number of black pixels of the differential image becomes, and in the case of the blocks having the same pixel values, all become the white pixels within the differential image. In the processing of the image encoding step, in general, to encode the black pixels within the image, the fewer the number of black pixels is, the higher the compression efficiency becomes, and by applying the exclusive-OR (XOR) to the pixel values between the blocks prior to the image encoding, the number of black pixels to become encoding objects is reduced, thereby enhancing the compression efficiency.

Here, the reference block selecting step preferentially selects a block close to the current processing block as a reference block from among the blocks processed and selected already by the processing block selecting step. In this way, at the compression time, by selecting the reference block by forward addressing from among the blocks which complete the processing of the exclusive-OR (XOR), the inputted images are divided into blocks in order and subjected to the exclusive-OR (XOR), thereby proceeding with the encoding processing with a result that the compression processing can be started without awaiting completion of the input of the entire image.

Further, at the restoration time, every time the block of the differential image is decoded from the code data, the processing of the exclusive-OR (XOR) with the restored reference block already decoded from the differential image can be executed, and a two-path type processing such as executing the exclusive-OR (XOR) again from the initial block after the entire block is restored is not required, and the restored image can be obtained more quickly, and the image which has completed the restoration is printed ahead of others from the printer, thereby shortening a waiting time of those using the restored image.

The image displacing step does not perform the replacement of the pixel value with the differential image of the processing block in case the pixel difference with the processing block and the reference block is equal to or not less than a predetermined number of pieces based on the result of having executed the differential image generating step. This takes into consideration that, in case the images of the processing block and the reference block are widely different, the number of black pixels within the differential image becomes large so as to reduce the compression efficiency, and by selecting the blocks in order from the neighborhood blocks most close to the processing block and performing the exclusive-OR (XOR) with the processing block, the number of black pixels obtained within the differential image is equal to or less than the predetermined number of pieces, and moreover, by selecting a block in which the number of black pixels becomes the smallest as a reference block, a reference block in which the pixel difference with the processing block becomes the smallest possible is selected, so that the black pixels within the differential image after being subjected to the exclusive-OR (XOR) becomes the smallest, thereby enhancing the encoding efficiency.

The processing block selecting step, in case the pixel value of the selected block matches a predetermined pattern set in advance, skips the processing of the exclusive-OR (XOR) with this processing block and the reference block. This takes into consideration that there are often the casers where, even when the exclusive-OR (XOR) is not performed with the reference block, the block in which the black pixels are not contained, and the block in which the pixel value of each line is all the same or the like can be effectively compressed by the encoding of the image encoding step applied subsequently, and with regard to the block which is known in advance capable of being subjected to high compression by the subsequent image encoding in this way, the exclusive-OR (XOR) is not applied, so that a processing load due to the exclusive-OR (XOR) is reduced, thereby avoiding the reduction of the compression efficiency.

The dividing step takes the number of horizontal pixels and the number of longitudinal pixels of the block as a multiple of eight. In this way, the bit length of the inner resistor of a central processor unit (CPU) mounted in the processing unit which executes the compression method of the present invention, and the number M of longitudinal pixels and/or the number N of horizontal pixels of the block are matched, and the exclusive-OR (XOR) with the pixel values among blocks is executed by the minimum possible number of processing steps. In general, since the bit length of the inner resistor of the CPU is a multiple of eight, the number of horizontal and longitudinal pixels of the block is also set to a multiple of eight accordingly.

The image encoding step, which is executed subsequent to the image displacing step that replaces the processing block with the differential image generated by the exclusive-OR (XOR) with the reference block, comprises:

a first region separating step of separating the image including the processing block of the differential image into a region including the black pixel and the region not including the black pixel in a unit of K line which is any positive number by scanning in a main scan direction;

a second region separating step of separating a logical line defined as a N line which is K times the positive number including the black pixels obtained by the first region separating step into a region including the black pixels and a region not including the black pixels in one line unit by scanning in a sub scan direction crossing a main scan direction; and an encoding step of encoding each region obtained by the first region separating step and the second region separating step as an element.

In this way, the present invention further scans the differential image generated by the exclusive-OR (XOR) with the image included in the processing block as an object in the main scan direction by the predetermined number of lines K, and combined with the compression method which scans this logical line in a sub scan direction so as to separate it into a region including the black pixels and a region otherwise, and encode each region as an element, further enhances the compression efficiency. By such a two-stage compression, the compression by the generation of the differential image by the exclusive-OR (XOR) initially performed is positioned as a pre-processing of the encoding to be performed later.

The present invention provides a restoration method of restoring an image from the image compressed data generated by the generation of the differential image by the exclusive-OR (XOR) and the encoding to be subsequently performed.

This image restoration method is characterized by comprising:

an inputting step of inputting the image compression data including a predetermined code data, the presence or absence of replacement with the differential image of each processing block, and a combination of the positional information of the reference block by a code input unit;

an image decoding step of decoding the inputted code data into an image by an image decoding unit, and a block decoding step of dividing the decoded image of the image decoding step into a processing block having a predetermined number of horizontal and longitudinal pixels by a block decoding unit, and subjecting the pixel values of the processing block and the reference block replaced with the differential image to the exclusive-OR (XOR) so as to be replaced with the pixel value of the processing block and decoded.

The restoration of an original image from the code data encoded by the compression method of the present invention is performed in such a way that, first, the image applied with the exclusive-OR (XOR) from the code data is decoded, and after that, with regard to each block divided into blocks, the reference block of the same position to which the exclusive-OR (XOR) is applied at the compression time is again subjected to the exclusive-OR (XOR), thereby restoring the original block. In this way, when the exclusive-OR (XOR) operation is executed two times, the data has the property of fully restoring the original data, and it is completely restored as before with no deterioration of the image.

(Program)

The present invention provides a program for image compression. This program for image compression allows a computer to execute:

a dividing step of dividing an inputted image into blocks having the predetermined number of horizontal and longitudinal pixels;

a processing block selecting step of scanning the divided blocks in a main scan direction and a sub scan direction so as to be selected in order as processing blocks;

a reference block selecting step of selecting as a reference block a block, in which a positional relation with the block selected at the processing block selecting step and a relation of a pixel value satisfy a predetermined condition;

a differential image generating step of generating a differential image by subjecting the pixel values of the processing block and the reference block to an exclusive-OR (XOR); and a block replacing step of replacing the processing block with the differential image in case the differential image satisfies a predetermined condition.

Further, the program of the present invention is characterized by allowing the computer to execute:

an image encoding step of encoding the image obtained by executing the block replacing step; and an output step of combining and outputting a code data obtained by executing the image encoding step, the presence or absence of replacement with the differential image of each processing block obtained by executing the block displacing step, and the positional information of the reference block.

The present invention provides a program for restoring the image compression data. This image restoring program is characterized by allowing a computer to execute:

an inputting step of inputting the image compression data including a predetermined code data, the presence or absence of replacement with the differential image of each processing block, and a combination of the positional information of the reference block;

an image decoding step of decoding the inputted code data into an image, and a block decoding step of dividing the decoded image of the image decoding step into a processing block having the predetermined number of horizontal and longitudinal pixels, and subjecting the pixel values of the processing block and the reference block replaced with the differential image to the exclusive-OR (XOR) so as to be replaced with the pixel value of the processing block and decoded.

The details of the program of the present invention are basically the same as those of the image compression method and the image restoration method.

(Apparatus)

The present invention provides an image compression apparatus. This image compression apparatus is characterized by comprising:

a dividing unit of dividing an inputted image into blocks having the predetermined number of horizontal and longitudinal pixels;

a processing block selecting unit of scanning the divided blocks in a main scan direction and a sub scan direction and selecting them in order as the processing blocks;

a reference block selecting unit of selecting a block as a reference block, in which a positional relation with the block selected at the processing block selecting unit and a relation of a pixel value satisfies a predetermined condition;

a differential image generating unit of generating a differential image by subjecting the pixel values of the processing block and the reference block to an exclusive-OR (XOR);

a block replacing unit of replacing the processing block with the differential image in case the differential image satisfies a predetermined condition;

an image encoding unit of encoding an image obtained by executing the block replacing unit;

a code data obtained by executing the image encoding unit; and a code outputting unit of combining and outputting the presence or absence of replacement with the differential image of each processing block obtained by executing the block replacing unit and the positional information of the reference block.

The present invention provides an image restoration apparatus of restoring the image compression data outputted from the image compression apparatus. This image restoration apparatus is characterized by comprising:

a code input unit of inputting the image compression data including the combination of a predetermined code data, the presence or absence of replacement with the differential image of each block, and the positional information of the reference block;

an image decoding unit of decoding the inputted code data into an image; and a block decoding unit of dividing the decoded image of the image decoding unit into the processing blocks having the predetermined number of horizontal and longitudinal pixels, and subjecting the pixel values of the processing block and the reference block replaced with the differential image to the exclusive-OR (XOR) so as to be replaced with the pixel value of the processing block and decoded. The details of the image compression apparatus and the image restoration apparatus of the present invention are basically the same as those of the image compression method and the image restoration method.

BRIEF DESCRIPTION OF THE DRAWINGS

FIGS. 10A-10C are explanatory drawings of a relation between a block line and the number of lines of a logical line;

FIGS. 22A-22C are explanatory drawings of the processing block in which the exclusive-OR is not applied in the present invention and the reference block;

BEST MODE OF CARRYING OUT THE INVENTION

Figure 1:
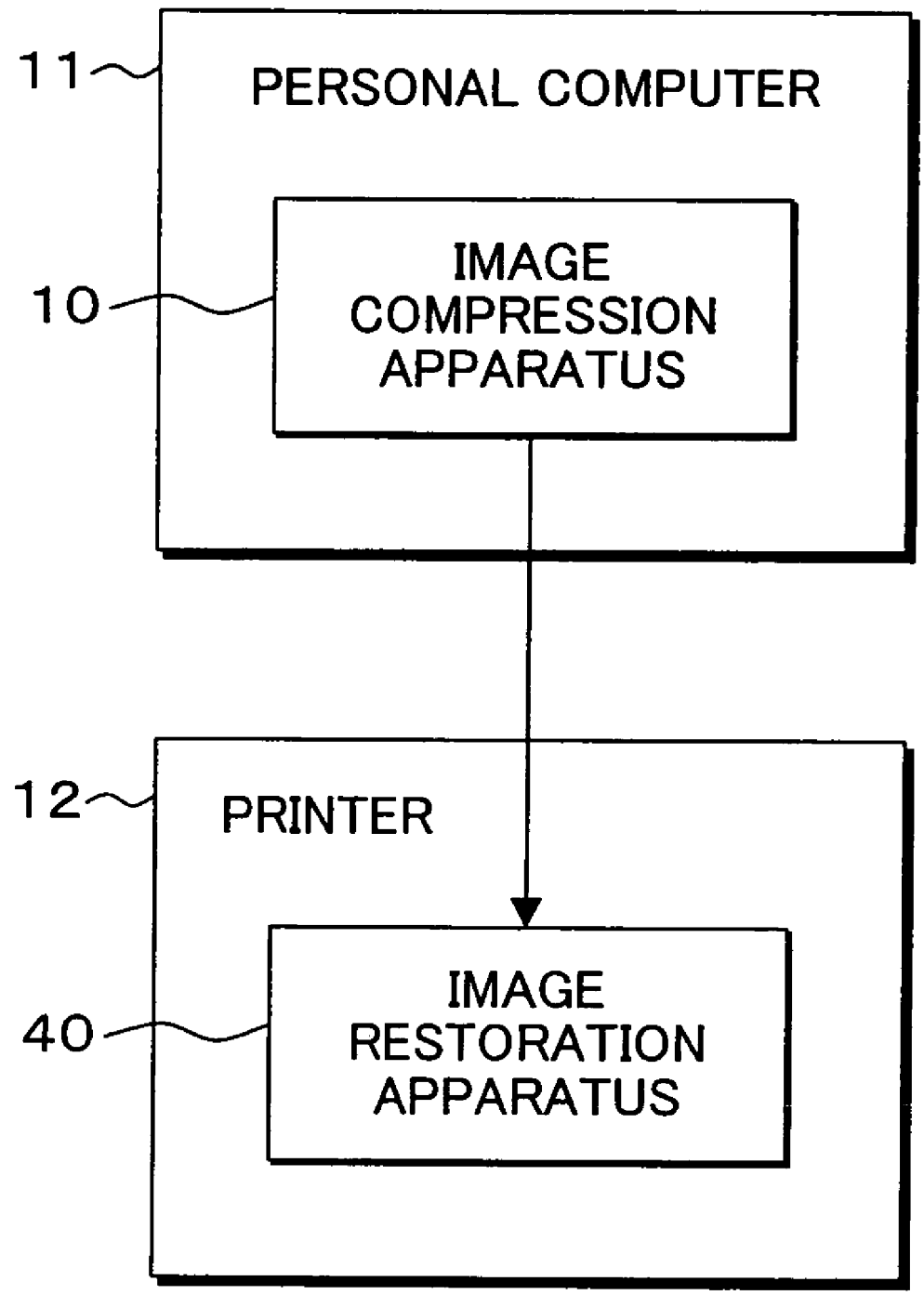
FIG. 1 is an explanatory drawing of an apparatus environment in which the present invention is applied.

FIG. 1 is an explanatory drawing of an apparatus environment in which an image compression method and an image restoration method according to the present invention is applied. An image compression apparatus 10 of the present invention is fitted to a personal computer 11 as a program, and an image restoration apparatus 40 of the present invention is provided at a printer 12 side. The image compression apparatus 10 inputs a binary bit-mapped data generated for printing by the personal computer 11 as an image data, and compresses this image data and transfers it to the image restoration apparatus 40 of the printer 12. The printer 12 is a printer which has no font, and performs printing upon receipt of a direct transfer of the bit-mapped image from the personal computer 11, and is provided with the image restoration apparatus 40 so that an image compressed data transferred from the image compression apparatus 10 of the present invention is restored and printed.

Figure 2:
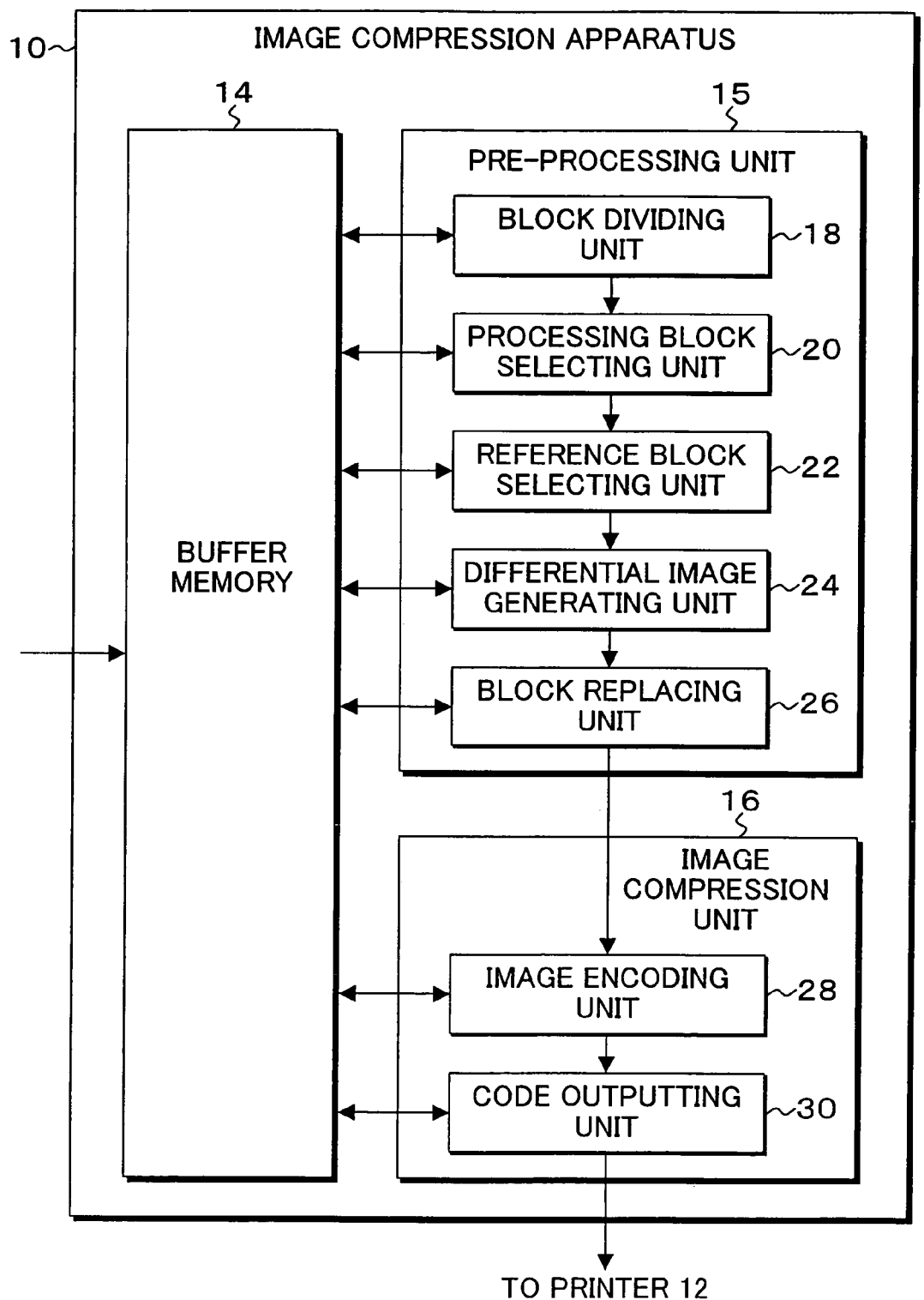
FIG. 2 is a block diagram of a functional configuration of an image compression apparatus according to the present invention.

FIG. 2 is a block diagram of the functional configuration of the image compression apparatus according to the present invention. In FIG. 2, the image compression apparatus 10 of the present invention comprises a buffer memory 14, a pre-processing unit 15 and an image compression unit 16. The buffer memory 14 holds the binary bit-mapped data to be transferred to the printer. In the image compression apparatus 10, the compression in two stages of the compression by the pre-processing unit 15 and the compression by the image compression unit 16 is performed, and the compressed image data is transferred to the printer 12. The pre-processing unit 15 is provided with a block dividing unit 18, a processing block selecting unit 20, a reference block selecting unit 22, a differential image generating unit 24, and a block replacing unit 26. Further, the image compression unit 16 is provided with an image encoding unit 28 and a code outputting unit 30. The function of each processing unit within the pre-processing unit is as follows. The block dividing unit 18 divides the input image held in the buffer memory 14 into blocks of the number of horizontal and longitudinal pixels, for example, the number of horizontal pixels M and the number of longitudinal pixel N (M×N). The processing block selecting unit 20 scans the divided blocks in a main scan direction and a sub scan direction and select them in order as a processing block. The reference block selecting unit 22 selects as a reference block a block, in which a positional relation with the block selected at the processing block selecting unit 20 and a relation of a pixel value satisfies a predetermined condition. With regard to the selection of this reference block, the present invention preferentially selects a block close to the current processing block as a reference block from among the blocks processed and selected already in the processing block selecting unit 20. The differential image generating unit 24 generates a differential image by subjecting the pixel values of the selected processing block and the reference block to the exclusive-OR (XOR). The block replacing unit 26 replaces the current processing block with the generated differential image in case the differential image generated at the differential image generating unit 24 satisfies a predetermined condition. As the replacement with the processing block of the differential image in this case, in case the difference of the number of pixels between the processing block and the reference block is not less than the predetermined number of pieces, since the compression by the exclusive-OR (XOR) is not suitable, the replacement with the differential image of the processing block is not performed. In the meantime, even in the processing block selecting unit 20, in case the pixel value of the selected block matches a predetermined pattern set in advance, to be more specific, in case the compression cannot be expected even when the exclusive-OR is performed, the subsequent processing is not performed, and the processing block is outputted as it is. Further, the number of horizontal pixels M and the number of longitudinal pixels N of the input image in the block dividing unit 18 are taken as a multiple of eight to correspond to a bit length of an inner resistor of a CPU.

Next, each processing unit of the image compression unit 16 has the following function. The image encoding unit 28 encodes the image including in the block the differential image obtained by the block replacing unit 26 of the pre-processing unit 15. This encoding adopts an image compression method of Japanese Patent Application Laid-Open No. 2001-388931 already applied by the present inventors. The code outputting unit 30 combines the code data obtained by the processing of the image encoding unit 28, the presence or absence of replacement with the differential image of each processing block obtained by the block replacing unit of the pre-processing unit 15, and the positional information of the differential block, and transfer them, for example, to the printer 12 as an image compression data.

Figure 3:
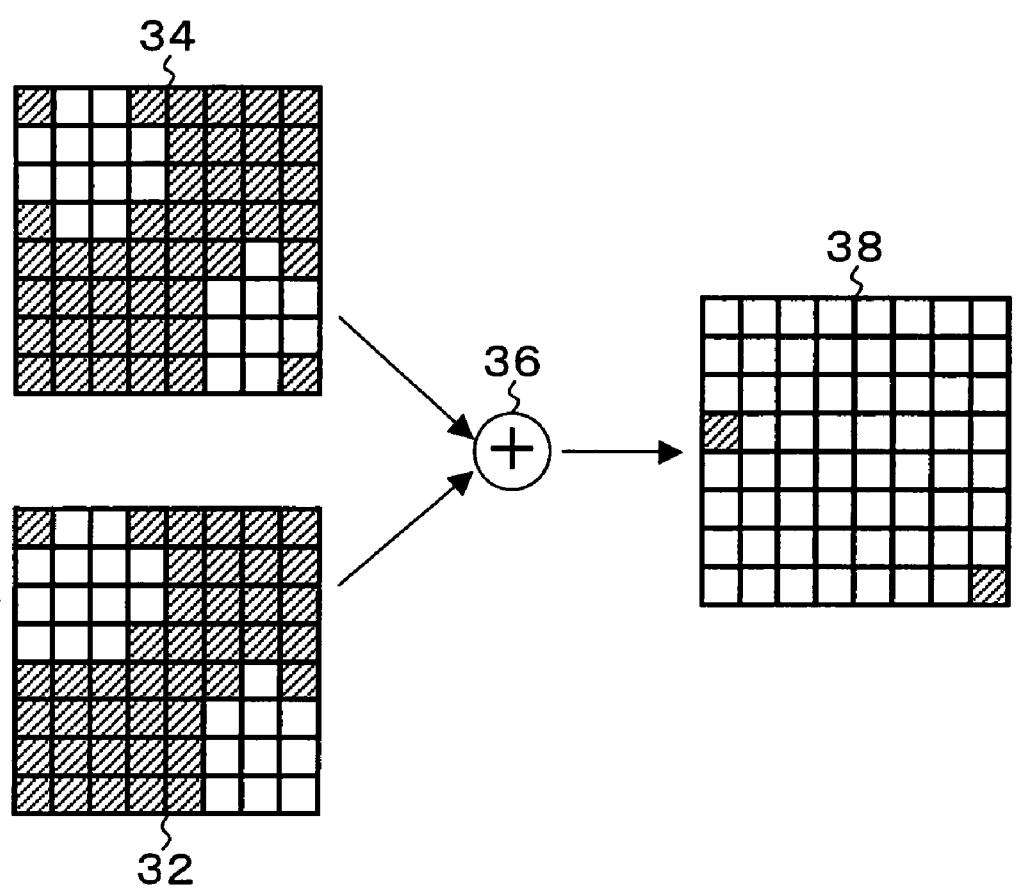
FIG. 3 is an explanatory drawing of an exclusive-OR processing of a block at the compression time of the present invention.

FIG. 3 is an explanatory drawing using a block image of the exclusive-OR processing of the block at the compressing time of the present invention. In FIG. 3, a processing block 32 takes a case of the number of horizontal and longitudinal pixels M×N=8×8 as an example, and generates a differential image 38 by taking the exclusive-OR (XOR) 36 between a reference block 34 selected from among the previously processed blocks and a processing block 32 which is currently a processing object. In case such an exclusive-OR is taken with the pixels of the same pixel position of the processing block 32 and the reference block 34, the portion in which the pixel value of the same position of both blocks is different, that is, the portion of the white pixel versus the black pixel or the black pixel versus the white pixel alone remains within the differential image 38 as a black pixel. Hence, in the dither image in which a pattern form continuously changes similarly to the gradation, the correlation of the pixel values between the neighborhood blocks is high, and the higher the correlation is, the fewer the black pixel of the differential image becomes, and in the case of the block of the same pixel arrangement, all becomes white pixels in the differential image, thereby realizing high compression.

Figure 4:
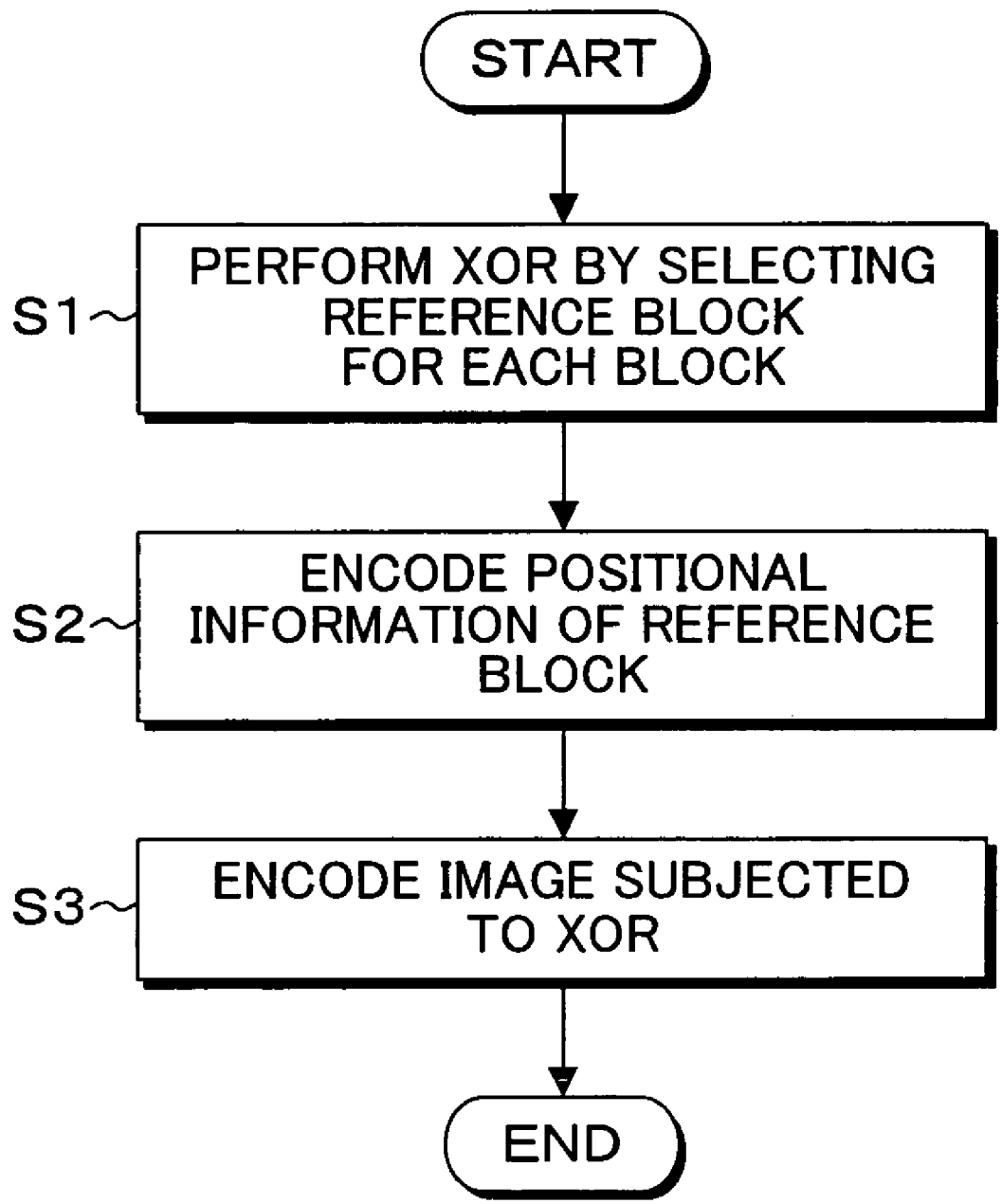
FIG. 4 is a schematic flowchart of an image compression processing according to the present invention.

FIG. 4 is a schematic flowchart of an image compression processing in the image compression apparatus 10 of FIG. 2. In this image compression processing, first, at step S1, the input image is divided into blocks, and after that, the processing blocks are selected in order, and the exclusive-OR (XOR) with the reference block selected for the processing block is performed so as to generate a differential image. Next, at step S2, the positional information of the reference block of each block subjected to the exclusive-OR (XOR) is encoded. Subsequently, at step S3, the image after being subjected to the exclusive-OR (XOR) is encoded, and is outputted as an encoded data for the input image together with the reference block positional information obtained at step S2.

Figure 5:
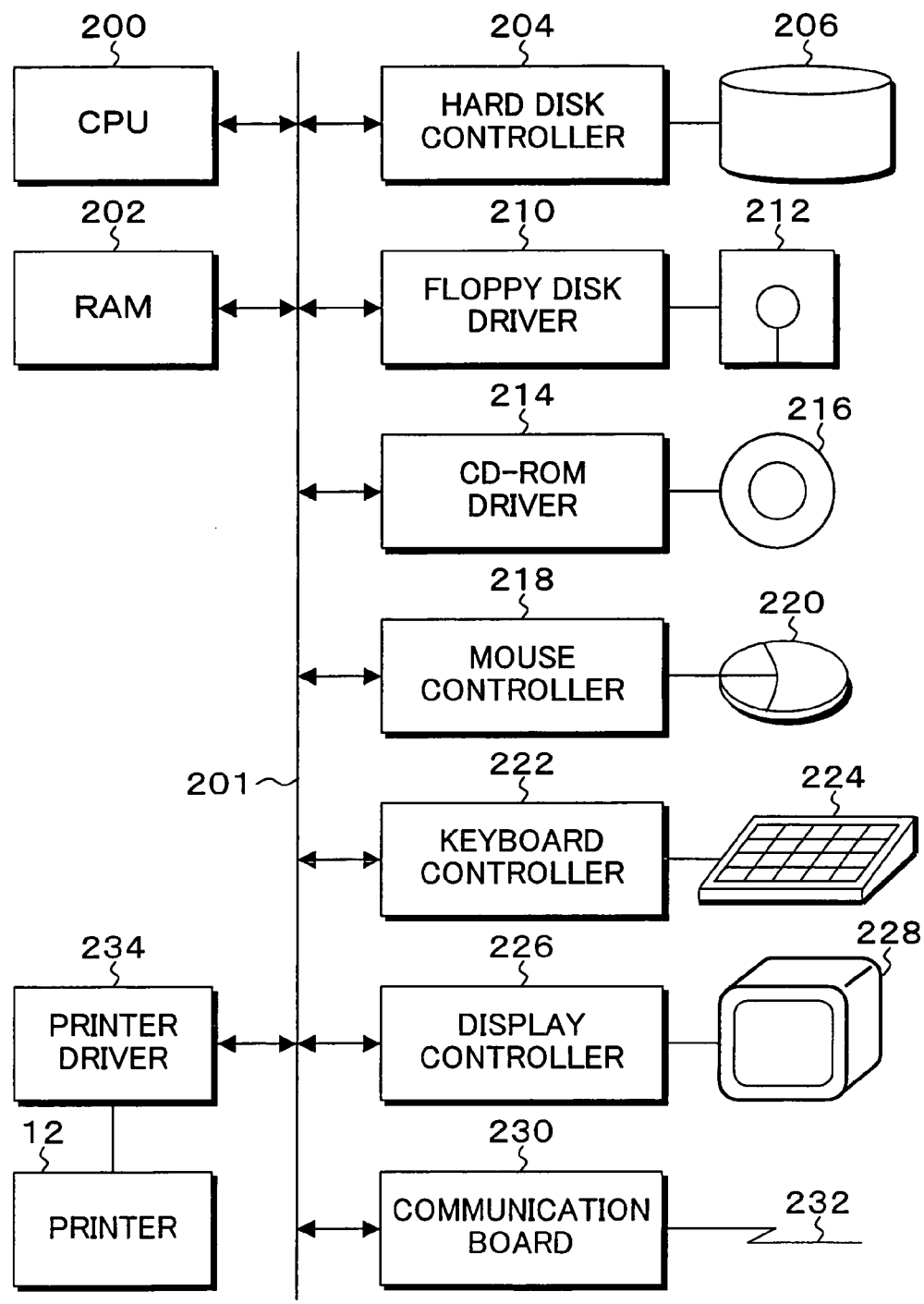
FIG. 5 is an explanatory drawing of a hardware environment of a computer in which the present invention is applied.

The image compression apparatus of the present invention in FIG. 2 is, for example, realized by hardware resources of the computer such as FIG. 5. In the computer of FIG. 5, a bus 201 of a CPU 200 is connected to a RAM 202, a hard disc controller (software) 204, a floppy disc driver (software) 210, a CD-ROM driver (software) 214, a mouse controller 218, a keyboard controller 222, a display controller 226, a communication board 230, and a printer driver 234. The hard disc controller 204 is connected to a hard disc driver 206, and is loaded with an application program for executing the data compression processing of the present invention, and performs the image compression by calling out a necessary program from the hard disc drive 206 at the activating time of the computer so as to be unfolded on the RAM 202 and executed by the CPU 200. The floppy disc driver 210 is connected to a floppy disc drive (hardware) 212, and can read and write for a floppy disc (R). The CD-ROM driver 214 is connected to the CD-drive (hardware) 216, which can read a data and a program stored in the CD. The mouse controller 218 transfers the input operation of the mouse 220 to the CPU 200. The keyboard controller 222 transfers the input operation of the keyboard 224 to the CPU 200. The display controller 226 performs a display for the display unit 228. The communication board 230 uses a communication line 232 and performs communications with other computers and servers through a network such as an Internet. The printer driver 234 transfers the code data image-compressed by the image compression apparatus of the present invention to the printer 12, and restores and prints the code data by the image restoration apparatus of the present invention provided at the printer 12 side.

Figure 6:
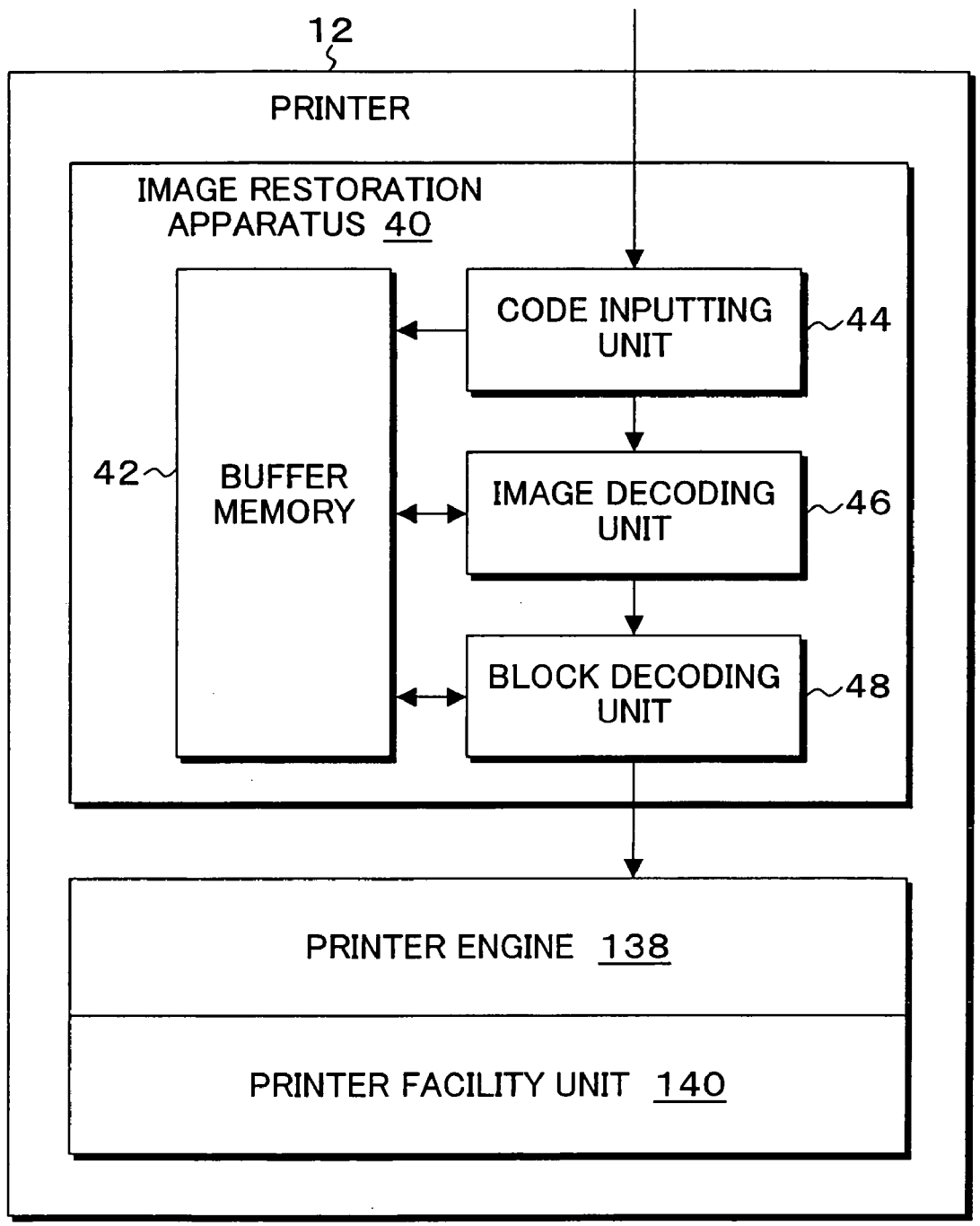
FIG. 6 is a block diagram of a functional configuration of an image restoration apparatus according to the present invention.

FIG. 6 is a block diagram of a functional configuration of the image restoration apparatus according to the present invention. In FIG. 6, the image restoration apparatus 40 of the present invention is provided, for example, at the printer 12 side, and restores the image from the image compression data transferred from the image compression apparatus 10 of FIG. 2, and supplies it to a printer engine 138 so as to allow a printer facility unit 140 to perform a printing operation. The image restoration apparatus 40 is provided with a buffer memory 42, a code input unit 44, an image decoding unit 46, and a block decoding unit 48. The code input unit 44 inputs the image compression data transferred from the image compression apparatus side, and this image compression data includes a combination of a predetermined code data, the presence or absence of replacement with the differential image of each processing block, and the positional information of the reference block. The image decoding unit 46 decodes an inputted code data into an image. This decoding processing is a restoration processing of the code data compressed by Japanese Patent Application Laid-Open No. 2001-388931 already proposed by the present inventor. The block decoding unit 48 divides the image decoded by the image decoding unit 46 into a predetermined number of horizontal and longitudinal pixels, that is, the processing block of, for example, (M×N)=8×8 which is the same as the image compression side, and subjects the pixel values of the processing block replaced with the differential image and the reference block to the exclusive-OR (XOR) so as to be replaced with the pixel value of the processing block, thereby decoding the processing block.

Figure 7:
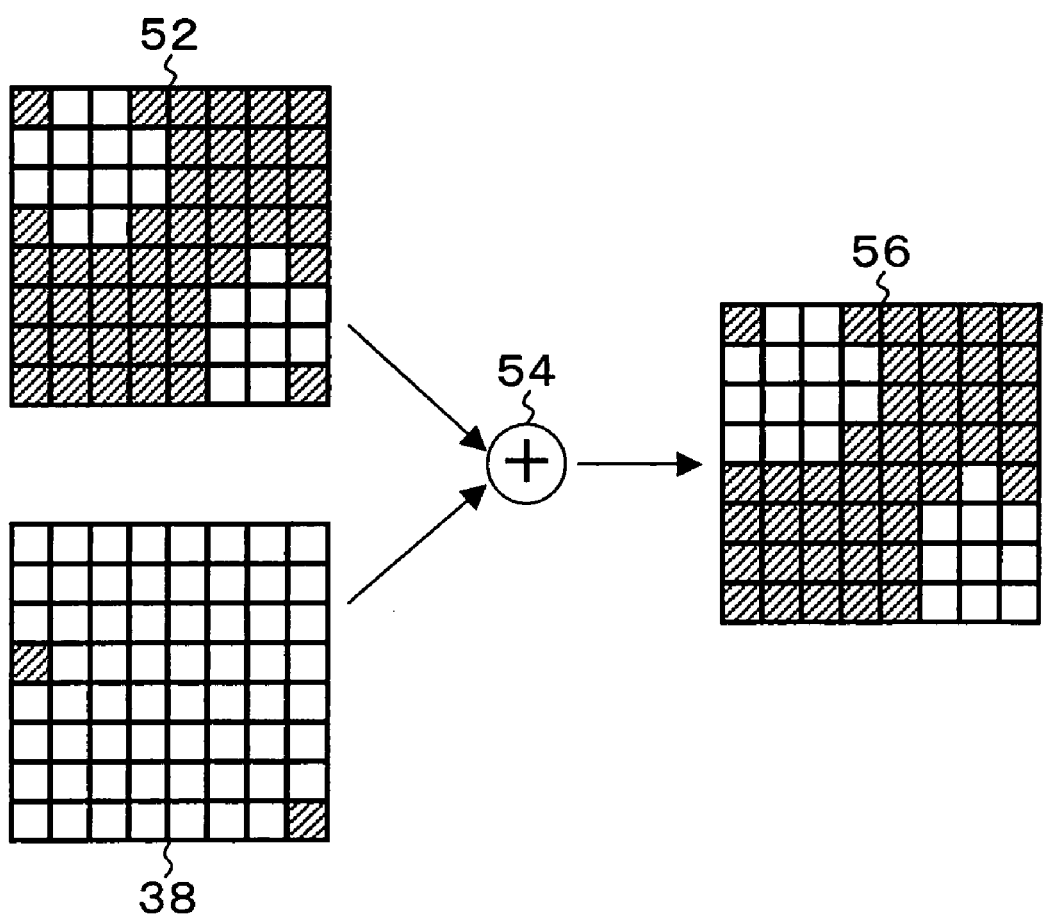
FIG. 7 is an explanatory drawing of the exclusive-OR of the block at the restoration time of the present invention.

FIG. 7 is an explanatory drawing of the exclusive-OR processing of the block at the restoration time of the present invention. This exclusive-OR processing at the restoration time is a restoration of the differential image 38 obtained by the exclusive-OR processing at the compression time of FIG. 3.

To perform the exclusive-OR (XOR) 54 of the differential image 38, the reference block 52 is selected from among the processing blocks, which have already completed the restoration, by the positional information of the reference block transferred from the compression side. This reference block 52 is the same as the reference block 34 in the compression side of FIG. 3. When the exclusive-OR (XOR) 54 with the differential image 38 and the reference block 52 is performed, an original block 56 is restored, and this is the same as the processing block 32 at the compression side of FIG. 3. In this way, in the present invention, when the exclusive-OR (XOR) operation is performed two times for the processing block by using the same reference block, by utilizing the property of the data which fully restores the original data, the image is completely restored as before with no deterioration of the image.

Figure 8:
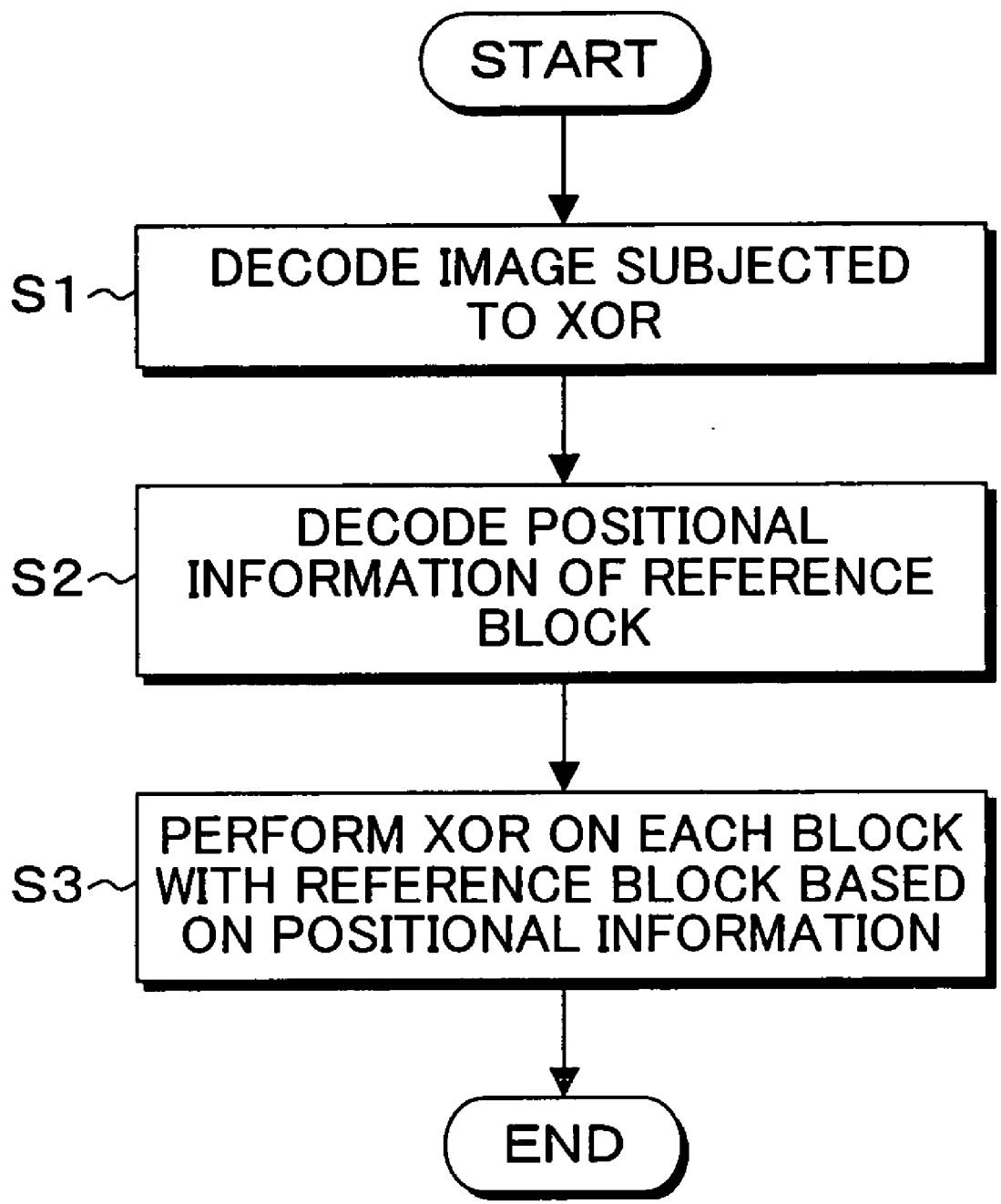
FIG. 8 is a schematic flowchart of an image restoration processing according to the present invention.

FIG. 8 is a schematic flowchart of the image restoration processing according to the present invention. In this restoration processing, the image subjected to the exclusive-OR (XOR) at step S1 is restored, and after that, the positional information of the reference block is decoded at step S2, and further, at step S3, each block is subjected to the exclusive-OR (XOR) processing based on the positional information of the reference block, thereby restoring the original image.

Figure 9:
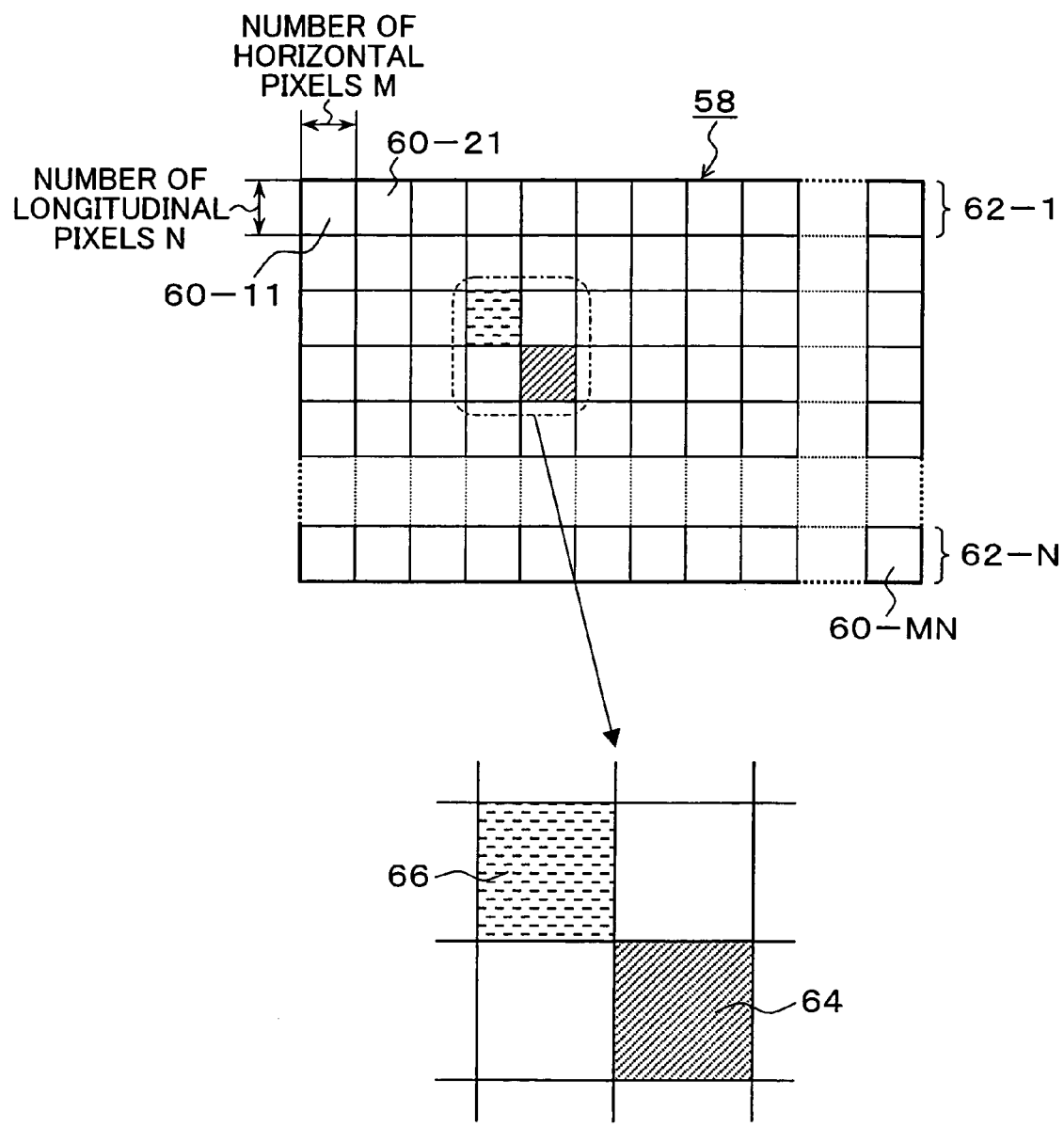
FIG. 9 is an explanatory drawing of a block division of an input image, and a processing block and a reference block.

Subsequently, each processing in the pre-processing unit 15 and the image compression unit 16 in the image compression apparatus 10 of FIG. 2 will be described in details. FIG. 9 is an explanatory drawing of the block division, the processing block after the division, and the reference block in the pre-processing unit 15 of FIG. 2. In FIG. 9, an input image 58, which is taken as a processing object, is divided into blocks 60-11 to 60 MN of the horizontal pixels M and the longitudinal pixels N which become a multiple of eight. In the present invention, with respect to the input image 58 divided into blocks, the processing is performed in units of horizontal block lines 62-1 to 62-N. On the lower part of the input image 58, there are shown a processing block 64 currently under processing and a reference block 66 selected for the block 64 and applied with the exclusive-OR (XOR).

Figure 10A:
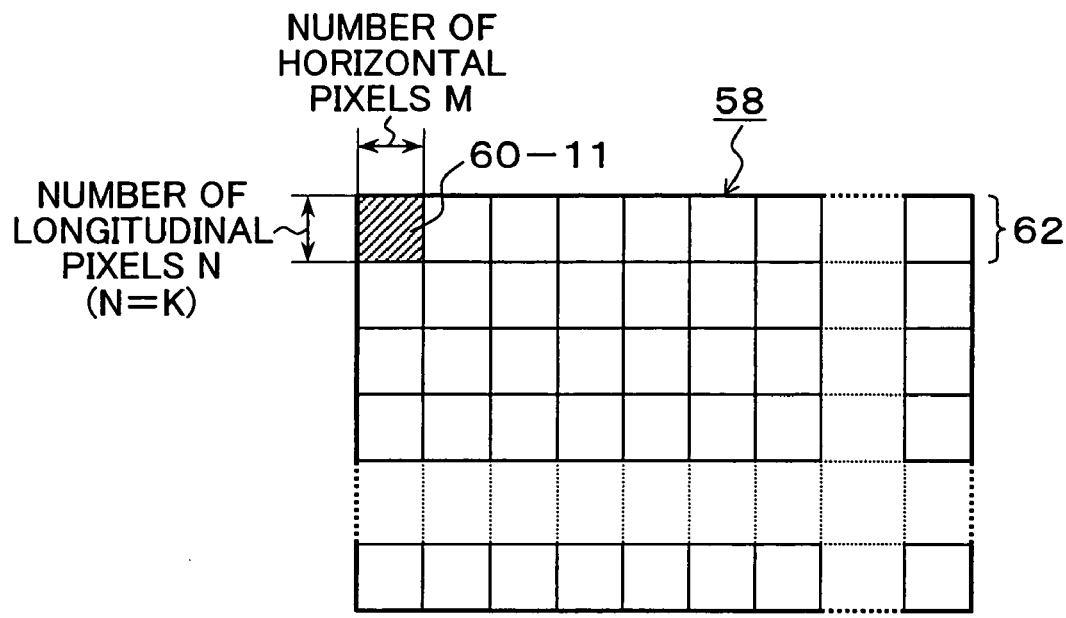
Figure 10B:
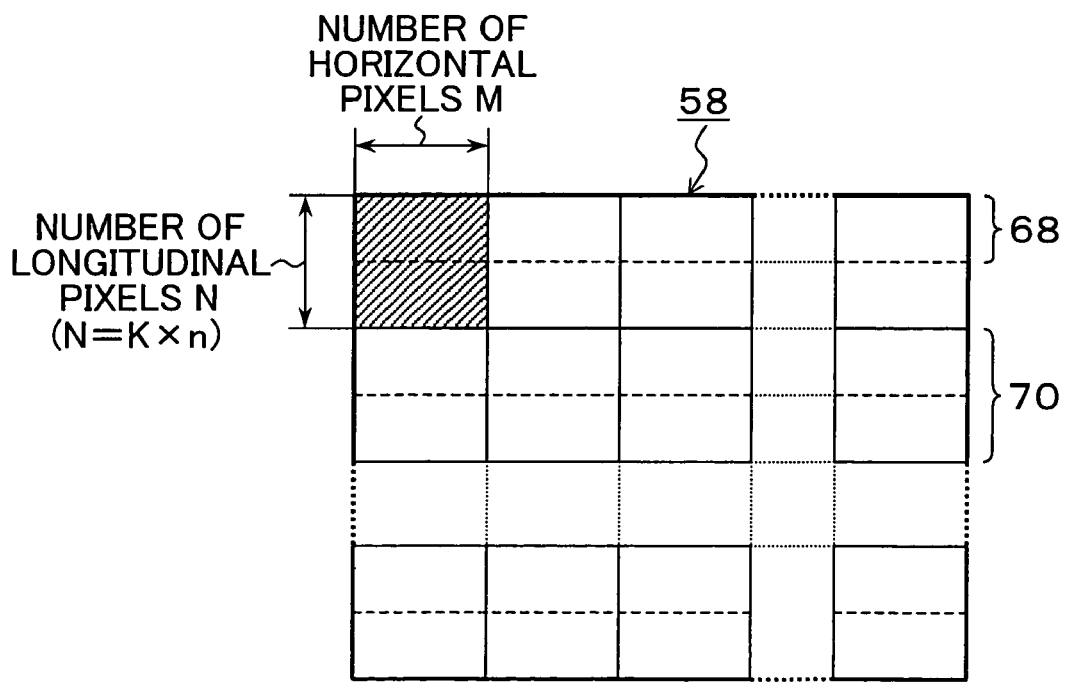

FIG. 10 is an explanatory drawing of the relation between the block lines and the number of lines of the logical line in the input image. In the present invention, basically as shown in FIG. 10A, the number of longitudinal pixels N of the exclusive-OR (XOR) is allowed be the same K as the number of logical lines or, as shown in FIG. 10B, is allowed to be integral times K so that a block boundary and a logical line boundary are matched. Here, the logical line means a processing concept in Japanese Patent Application Laid-Open No. 2001-388931 proposed already by the present inventor in the image encoding unit 28 provided in the image compression unit 16 of FIG. 2. That is, in this encoding processing, the image is scanned by the predetermined number of lines K in the main scan direction, and the region including the black pixel is separated as the logical line, and this logical line is further scanned in the sub scan direction so as to be separated into a region including the black pixel and a region otherwise, thereby performing the compression to encode each region as an element. Consequently, between the logical line in this case and the number of longitudinal pixels N of the block of the exclusive-OR (XOR) of the present invention, the block boundary and the line boundary of the logical line are matched by making the number of logical lines K the same as N or making N integral times K of the logical line, thereby enhancing the compression efficiency. In contrast to this, as shown in FIG. 10C, in case the number of lines K of the logical line 72 and the number of longitudinal pixels N of the block line 74 are not in a relation of integral multiples and the block boundary and the line boundary of the logical line are not matched, the differential image after being subjected to the exclusive-OR (XOR) strides across the logical lines, thereby causing a trouble of the compression efficiency being reduced.

Figure 11:
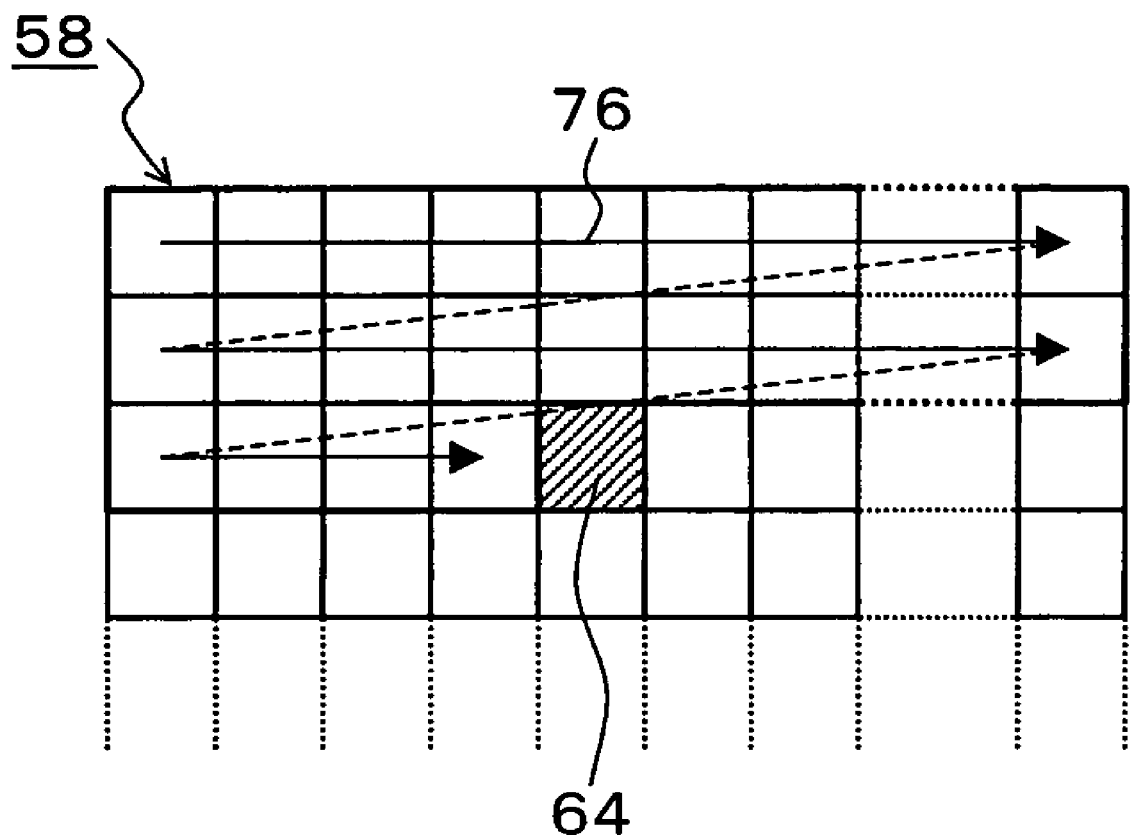
FIG. 11 is an explanatory drawing of the sequential order of a block processing in the image compression of the present invention.

FIG. 11 is an explanatory drawing of the sequential order of the block processing in the image compression by the exclusive-OR (XOR) of the present invention. In FIG. 11, the input image 58 is divided into blocks of the horizontal and longitudinal (M×N) pixels, and after that, similarly to the block processing sequential order 76 of an arrow mark, the divided blocks are scanned in the main scan direction, and after that, returning to the beginning head of the next line, the processing to scan in the main scan direction is repeated. As against such a block processing sequential order 76, supposing that the block currently under processing is the processing block 64, the reference block for performing the exclusive-OR (XOR) with this processing block 64 is selected from among the blocks processed before that. By selecting the reference block for the processing block 64 from the processed blocks in this way, the compression processing can be preceedably started without waiting for the completion of the input of the entire image. Similarly, at the restoration time, every time the image of the block is restored, by executing the exclusive-OR (XOR) with the block replaced with the differential image which is now a processing object and the reference block already restored, with respect to the restoration processing, the block restoration can be performed by one path, and the printing can be made by the printer preceedably from the image portion which completes the restoration so that the waiting time at the restoration side can be shortened.

Figure 12A:
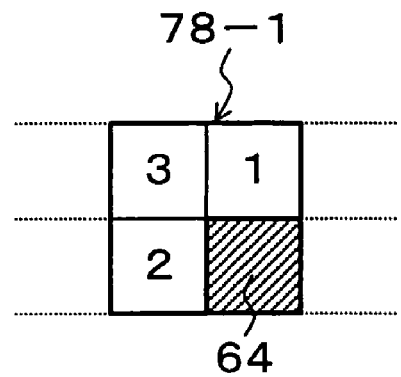
FIGS. 12A-12C are explanatory drawings of a template designating the selection sequential order of the reference block in the present invention.
Figure 12B:
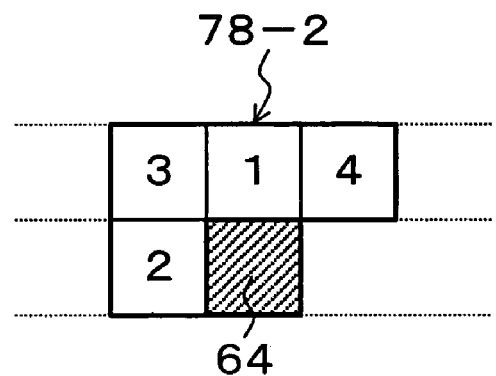
Figure 12C:
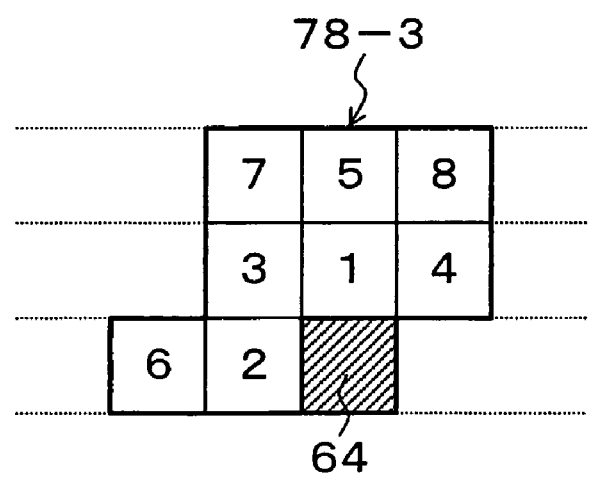

FIG. 12 is an explanatory drawing of the template to designate the selection sequential order of the reference block to be selected for the processing block by the exclusive-OR (XOR) processing of the present invention. In the differential image by the exclusive-OR (XOR) with the processing block and the reference block of the present invention, the higher the correlation of the pixel value between the blocks is, the fewer the black pixel of the differential image becomes so as to enable the high compression, and since the block closer to the processing block is higher in correlation, by utilizing this correlation, the reference block is selected from among the blocks already processed for the processing block. FIG. 12A shows a two×two matrix template 78-1, and sets three blocks of the above, the left, and the left above of the processing completed side as a reference block candidate for the processing block 64, and as a selection sequential order, No. 1 is set for the above, No. 2 is set for the left, and No. 3 is set for the left above. FIG. 12B shows a template 78-2 adding a block at the right above the processing block 64 for FIG. 12A, and the newly added right above block is set as a selection sequential order No. 4. FIG. 12C shows a template 78-3 adding four blocks of the selection sequential order Nos. 5, 6, 7, and 8 in addition to FIG. 12B. The basic concept of designating a sequential order of the reference blocks in this template is that the blocks neighboring the processing block in relation to the processing block are taken into a sequential order of the left above and the right above subsequent to the above or the right, and further, the external blocks are taken into a sequential order of the above, the left, the left above and the right above. By using either from among these three types of the templates 78-1 to 78-3, the reference blocks are selected in a numerical order for the processing block 64, and by performing the exclusive-OR (XOR) with the selected reference block, the reference block in which the number of generated black pixels of the differential image becomes the smallest is selected, thereby generating the differential image.

Figure 13:
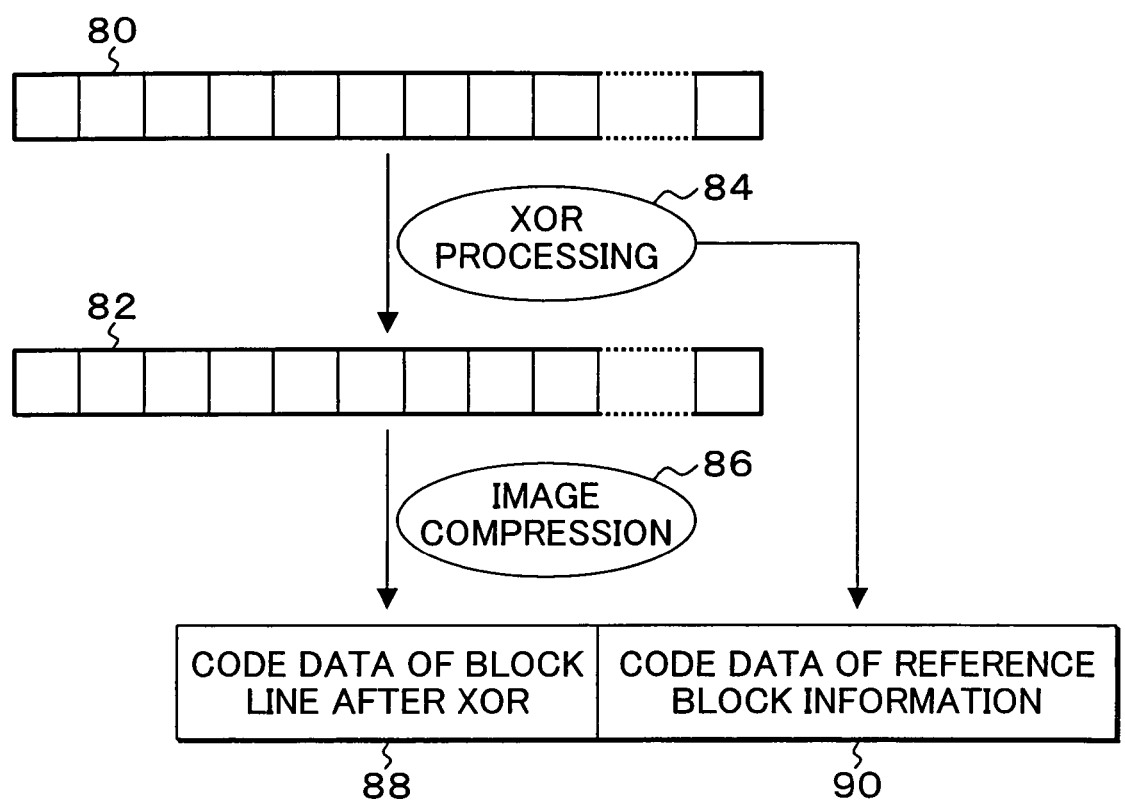
FIG. 13 is an explanatory drawing of the image compression processing in a block line unit in the present invention.
Figure 14:
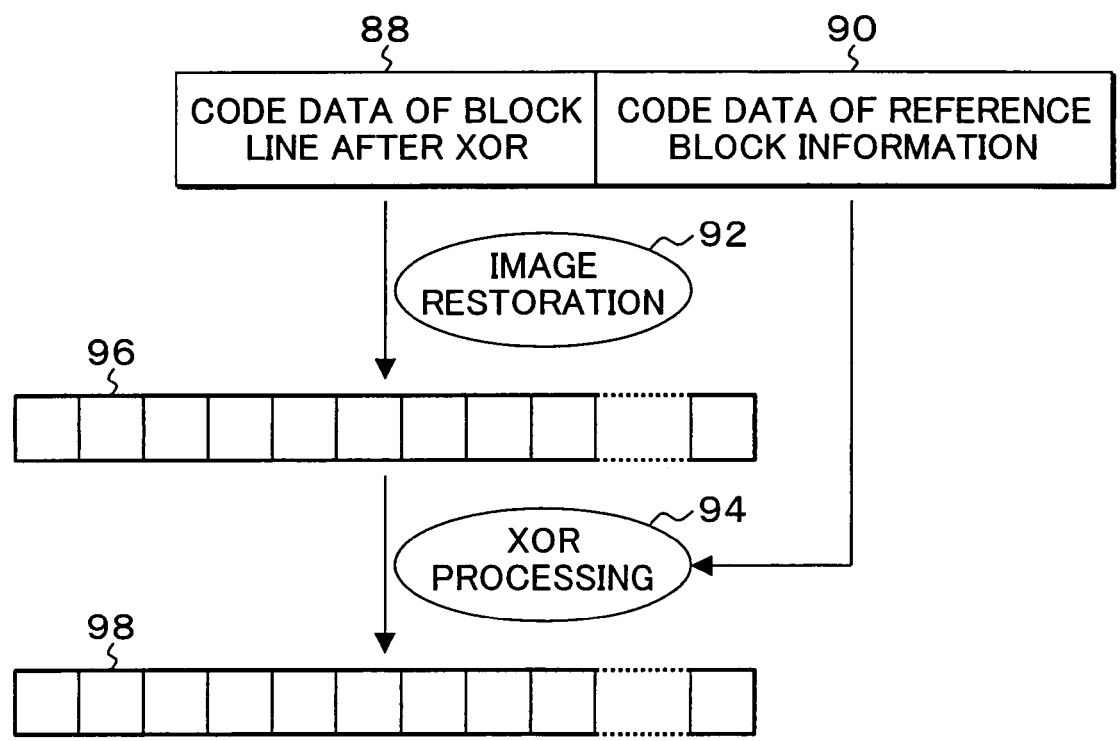
FIG. 14 is an explanatory drawing of the image restoration processing in a block line unit in the present invention.

FIG. 13 is an explanatory drawing of the image compression processing in a unit of the block line in the present invention. To encode the image in the present invention in a unit of the block, as shown in FIG. 11, the scan is made according to a raster scan sequential order in the main and sub scan directions. In this case, the encoding can be made by performing the exclusive-OR (XOR) with the reference block for every one block, but, it is more efficient to encode in a unit of the block line. For example, when the code data is compressed in a unit of the block line and outputted, since the restoration side which receives the encoded data can similarly restore the image in a unit of the block line, there is an advantage of being able to start the restoration without awaiting the completion of the compression processing of the entire image. Hence, as shown in FIG. 13, at the time of the image compression processing, an input block line 80 is taken out as a processing object, and the XOR processing is executed in order from the beginning head of the input block line 80, and a block line 82 after the XOR is generated, and after that, the block line 82 is collectively image-compressed, and a code data 90 of the already obtained reference block information and a code data 88 of the block line after the XOR are transferred to the restoration side. The restoration side which receives the code data by the compression in a unit of the block line at the compression side in this way performs the processing as shown in FIG. 14. In the restoration processing of FIG. 14, the code data 88 of the block line after the XOR obtained by the restoration in a unit of the block line and the code data 90 of the reference block information are received, and after that, an image restoration 92 of the code data 88 of the block line after the XOR is performed, thereby generating a restored block line 96. Subsequently, the position of the reference block is obtained from the code data 90 of the reference block information, and a XOR processing 94 which is an exclusive-OR is performed, and the data of each block of the block line 98 subjected to the XOR for every block is decoded in order. At the stage where the image restoration of this block line 98 is completed, a printing operation in a unit of the block line can be performed at the printer side.

Figure 15:
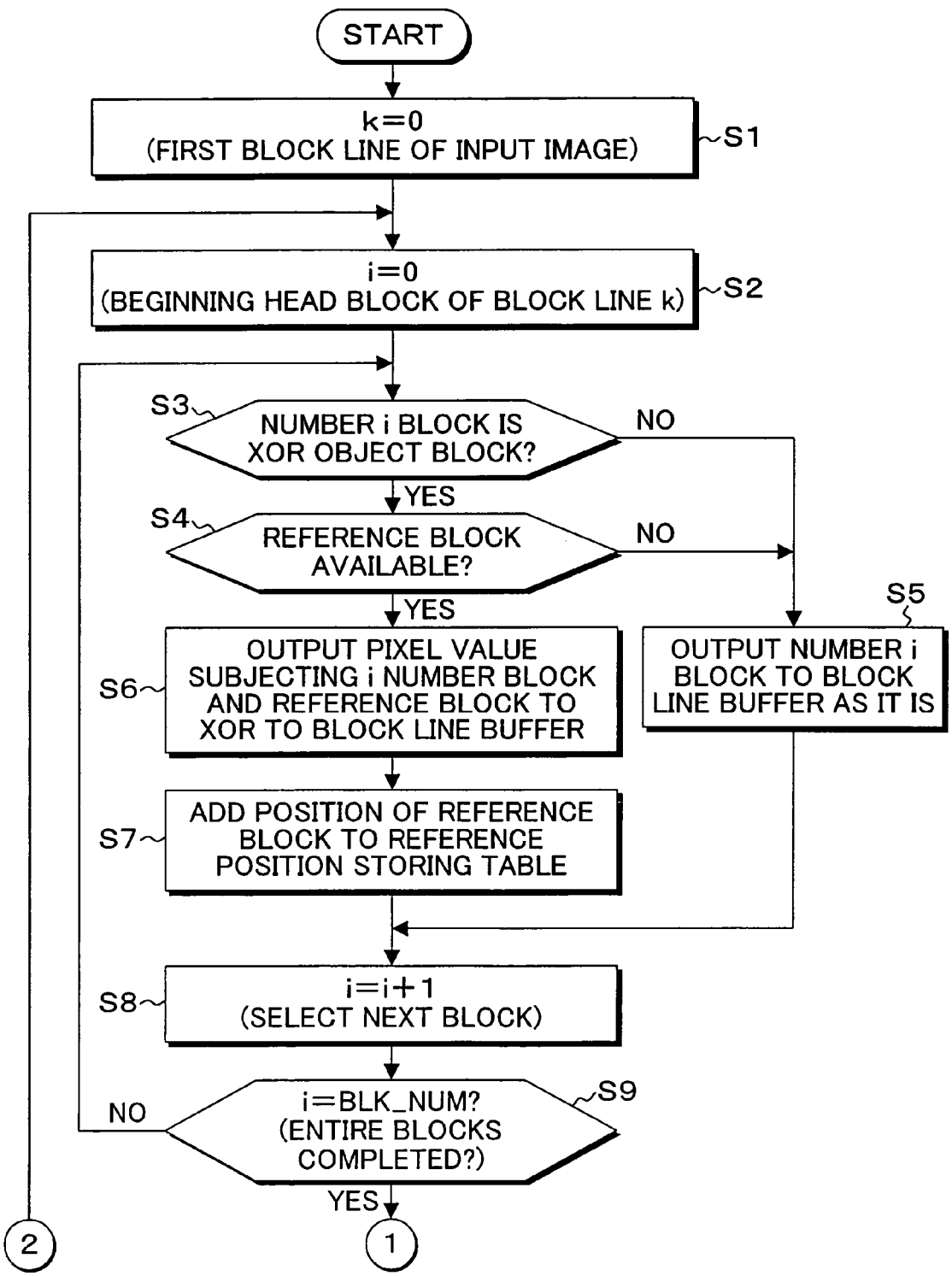
FIG. 15 is a flowchart of the image compression processing according to the present invention.
Figure 16:
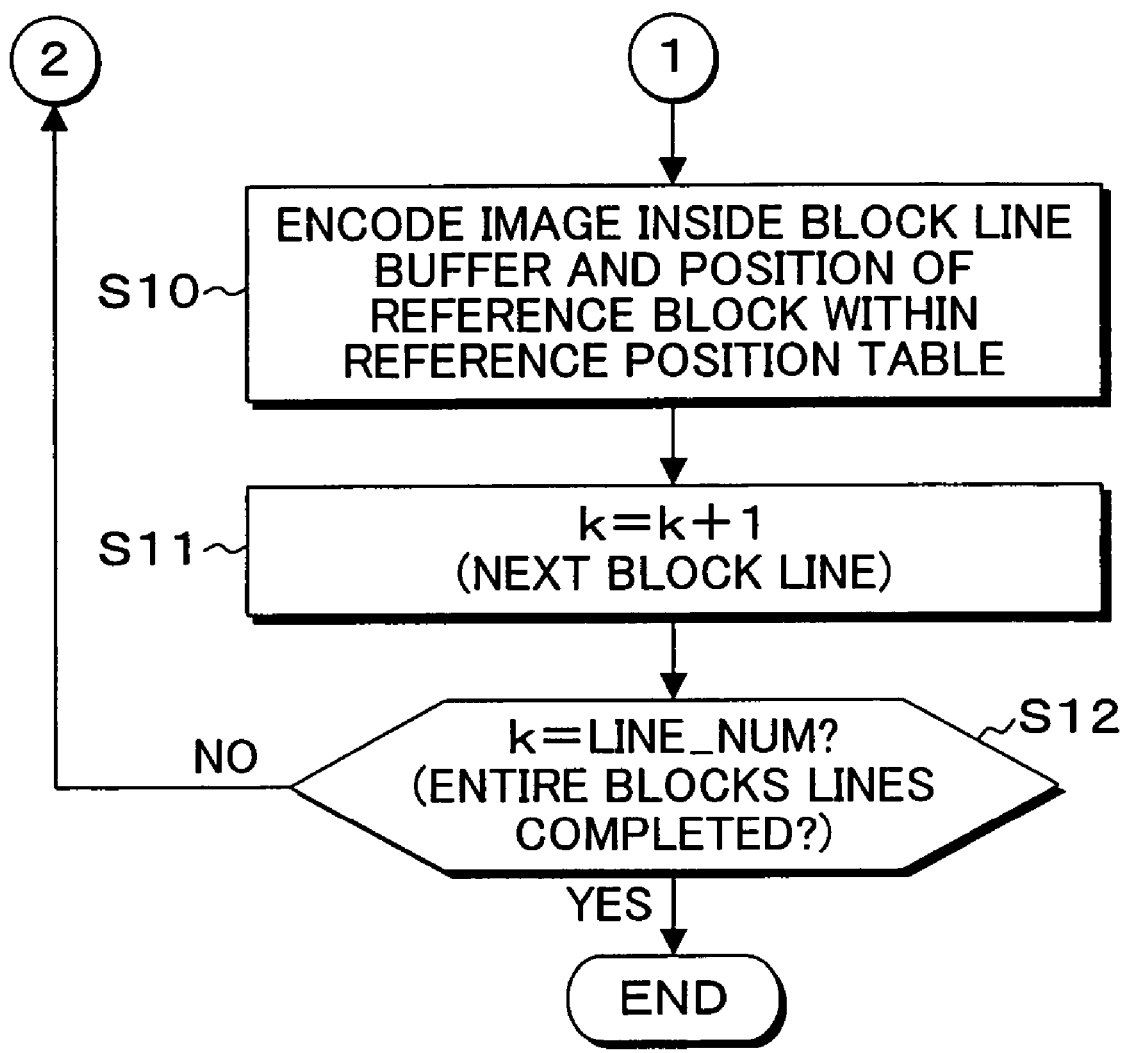
FIG. 16 is a flowchart of the image compression processing continuing to FIG. 15.

FIGS. 15 and 16 are flowcharts of the image compression processing according to the present invention, which performs the image compression in a unit of the block line. The processing procedure of this image compression processing is as follows.

Step S1:
The first block line in the input image is selected, and a variable k showing the number of the block line is provided with 0 showing the beginning head block line.

Step S2:
The first block of the block line k is selected, and the number i showing the block number is provided with 0 showing the beginning head block.

Step 3:
Whether or not the number i block should be subjected to the exclusive-OR (XOR) is determined. For example, in the case of the block where the entire block is all white or all black and the encoding efficiency by the exclusive-OR (XOR) is not improved, it is determined that the exclusive-OR (XOR) is not executed, and the procedure advances to step S5. In case it is determined that the exclusive-OR (XOR) is performed, the procedure advances to step S4.

Step S4:
Whether or not there exist the number i block and the reference block to be subjected to the exclusive-OR (XOR) is determined, and when existing, the procedure advances to step S6, and when not existing, the procedure advances to step S5.

Step S5:
The pixel value of the i number block is outputted as it is to the block line buffer for storing the block line which is separately prepared and subjected to the exclusive-OR, and after that, the procedure advances to step S8 to select the next block.

Figure 17:
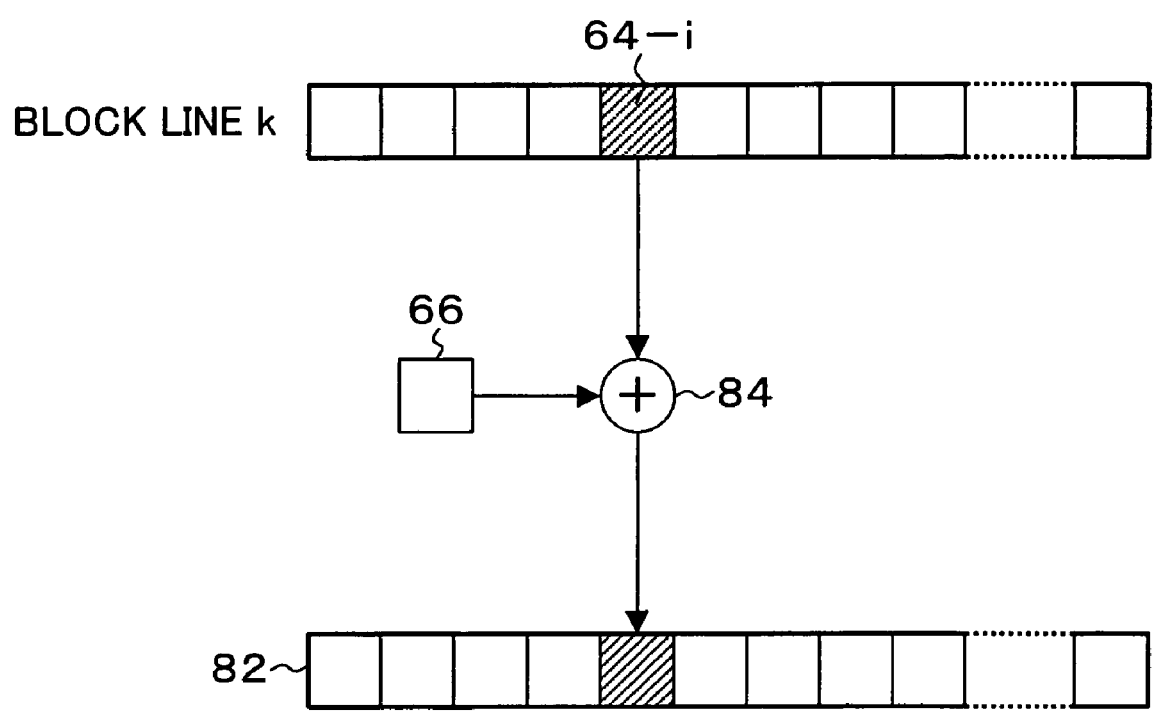
FIG. 17 is an explanatory drawing of a storing position to a block line buffer of the block subjected to the exclusive-.

Step S6:
The exclusive-OR (XOR) is performed with the pixels of the i number block and the reference block, and outputs them to the block line buffer. When the output to the block line buffer at steps S5 and S6, as shown in FIG. 17, the pixel value obtained by the exclusive-OR with the reference block 66 is outputted to the position of the same block line buffer 82 as the i number block in the block line k.

Step S7:
The position of the reference block is added to a reference block position storing table. The position of the reference block can use the number showing the block selection order of the reference block template shown in FIG. 12.

Step S8:
The next block is selected, and the block number i is added with 1.

Step S9:
The block number i and the number of blocks BLK_NUM within the block line are compared, and when both of them match, it is determined that the exclusive-OR (XOR) of all blocks within the block line is completed, and the procedure advances to step S10, and when both of them do not match, it is determined that the exclusive-OR (XOR) processing is not completed, and the procedure returns to step S3.

Step S10:
The image within the block line buffer and the position information stored within the reference block position storing table are encoded, respectively, and are outputted as the code data of the block line k.

Step S11:
The next block line is selected, and the block line number k is added 1.

Step S12:
The block line number k and the number of block lines LINE_NUM within the input image are compared, and when both of them match, it is determined that the encoding processing of the entire block line is completed, and the processing is completed, and when both of them do not match, it is determined that there exists a block line which does not complete the encoding processing, and the procedure returns to step S2.

Figure 18:
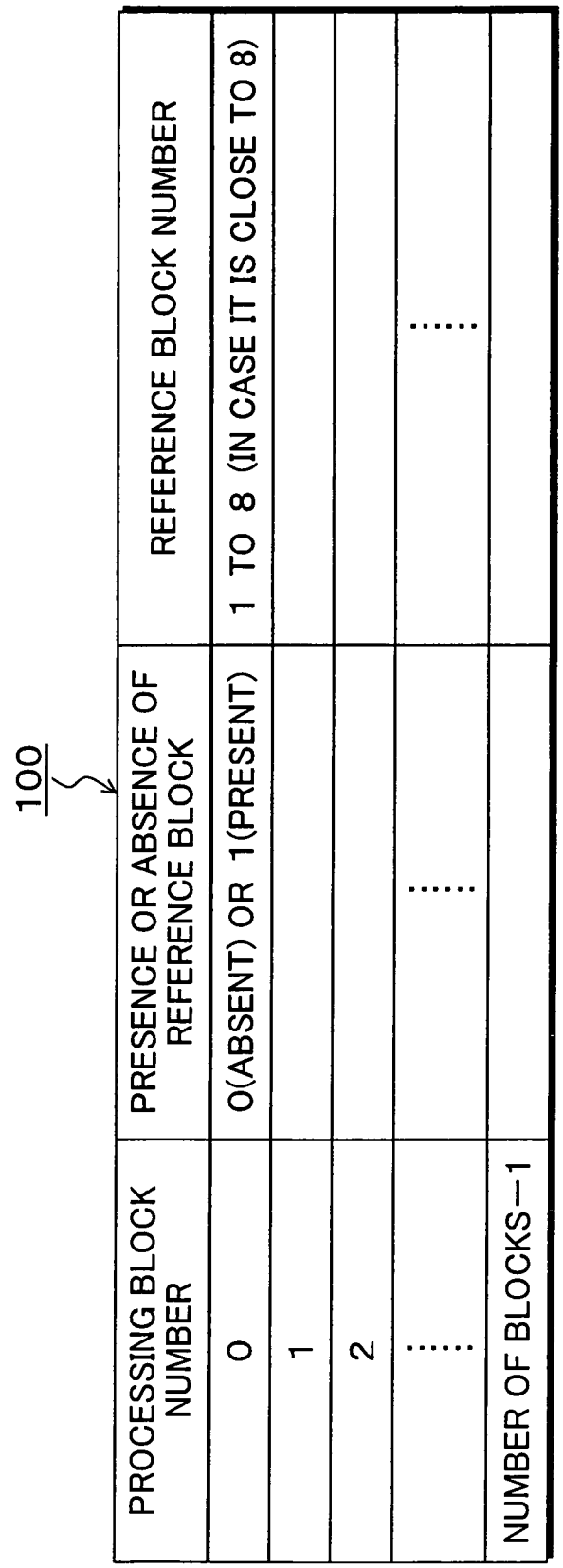
FIG. 18 is an explanatory drawing of a reference block position storing table.

FIG. 18 is an explanatory drawing of a reference block position storing table 100 to be used for step S7 of FIGS. 15 and 16. This reference block position storing table 100 has storing regions for the processing block numbers, the presence or absence of reference block, and the reference block numbers, and the processing block numbers are allotted with the number 0 to (the block number −1) corresponding to the entire blocks within the block line, and the presence or absence of the reference block number and the reference number according to each region are stored. As for the presence or absence of the reference block number, when it exists, 1 is written, and when it does not exist, 0 is written.

Figure 19:
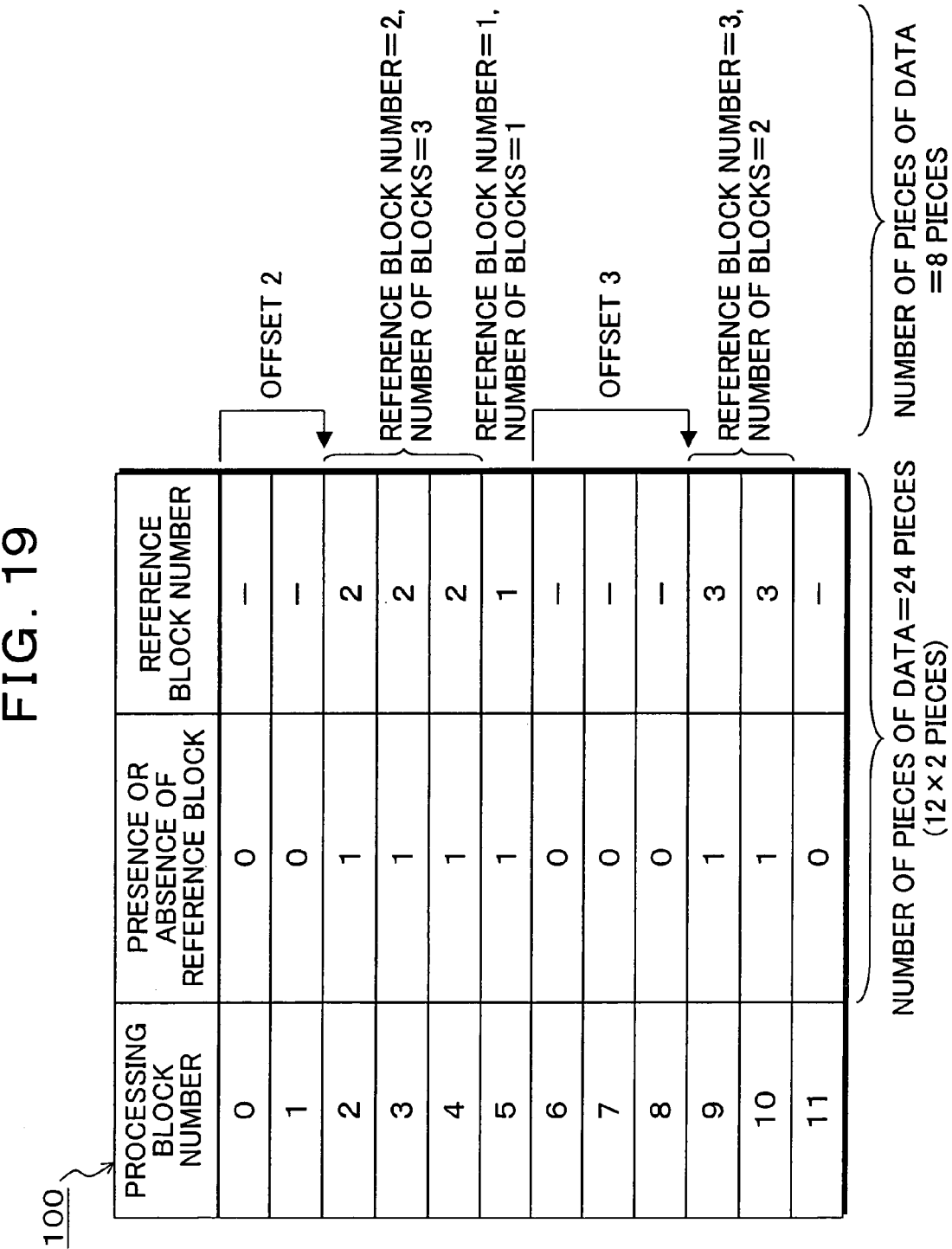
FIG. 19 is an explanatory drawing of the reference block position storing table and an encoding.

FIG. 19 is a specific example of the reference block position storing table 100 of one block line generated by the compression processing of FIGS. 15 and 16, and takes as an example the case where 12 blocks from 0 to 11 as the processing block number are taken as one block. Further, the presence or absence of the reference block is shown by 1 when the reference block exists, and by 0 when the reference block does not exist, and moreover, as the reference block number, the numerical value of the processing block number selected as a reference block is stored. As the encoding method in step S10 of FIGS. 15 and 16 in relation to such a reference block position storing table 100, the number of blocks where no reference block exists is encoded as an offset value, and in case the reference block exists, the reference block number and the number of continuous reference times are combined so as to be encoded. For example, in FIG. 19, for the processing block numbers 0 and 1, since there exists no reference block number, this case is taken as [offset 2]. Further, for the processing block numbers 2 to 4, since the same reference block number 2 continues, an encoding is made by a combination of [reference block number=2 and the number of blocks=3]. In this way, in the example of the reference block position storing table 100 of FIG. 19, when no encoding is made, the value of 24 pieces is required as against the case where the value of only eight pieces is required when encoding is made by the above described method, thereby reducing an encoding size.

Figure 20:
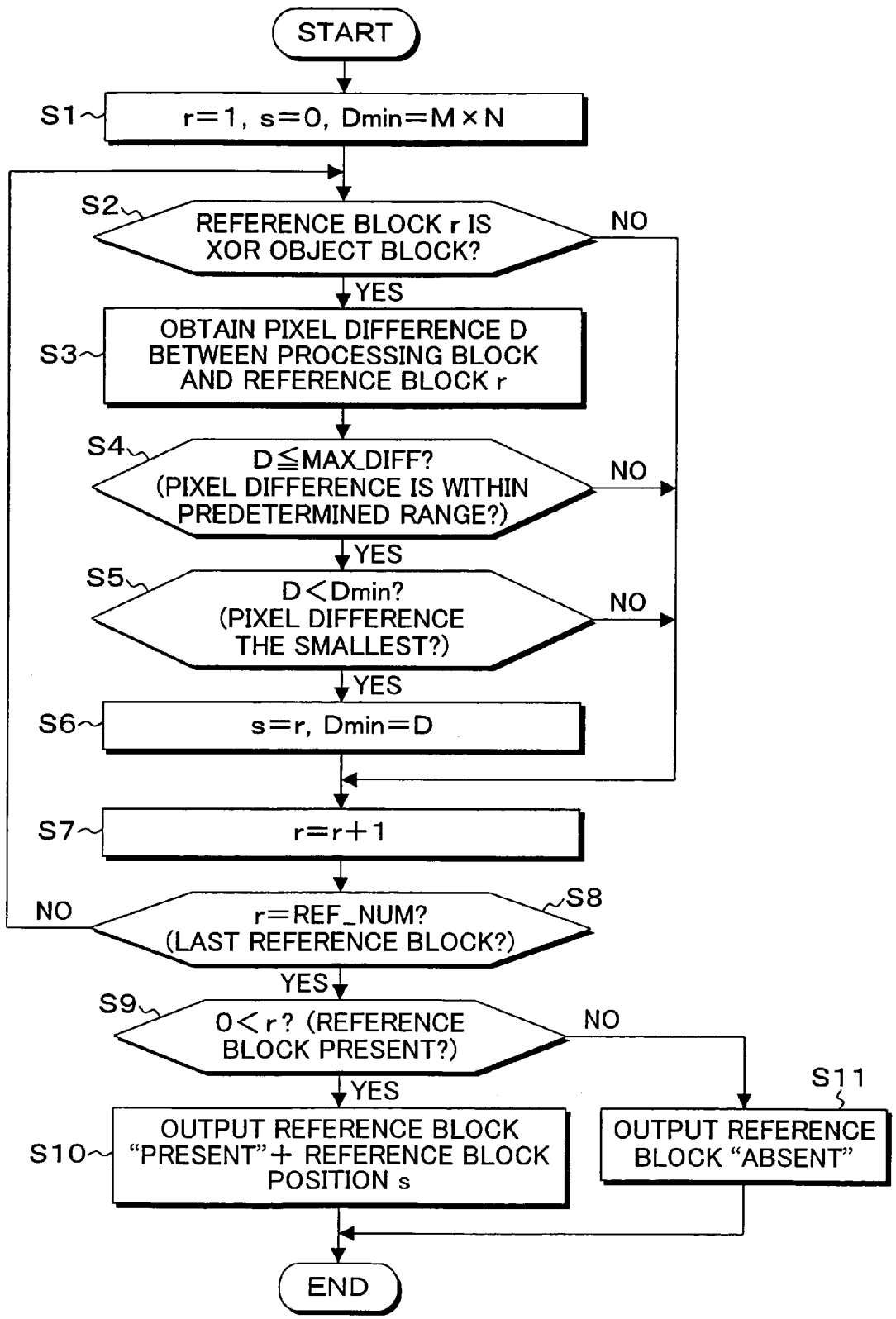
FIG. 20 is a flowchart of the reference block selection processing in FIGS. 15 and 16.

FIG. 20 is a flowchart showing the details of the reference block selection processing in step S3 of FIGS. 15 and 16. In the processing of FIG. 20, whether or not the reference block itself is a block to be subjected to the exclusive-OR (XOR) is determined. Based on the relation of the pixel value of the processing block subjected to the exclusive-OR (XOR) with the reference block and the pixel difference, the reference block is selected. Hence, the procedure of the reference block selection processing will be described as follows.

Step S1:
A variable r showing the reference block number is provided with 1 showing the first reference block number, and the variable s showing the selected reference block number is provided with 0 which shows that the reference block is not yet selected. Further, Dmin storing the smallest value of the number of differential pixels is set with the number of total pixels of a position block (=the number of horizontal pixels M×the number of longitudinal pixels N) which shows a value in which the number of pixel differences is the maximum.

Step S2:
Whether or not the reference block r is a block to be subjected to the exclusive-OR (XOR) is determined, and when determined it is to be subjected to the exclusive-OR (XOR), the procedure advances to step S3, and when not determined, the procedure advances to step.S7

Step S3:
The pixel values locating at the same position between the processing block and the reference block r are compared, the number of different pixel values D are counted.

Step S4:
The pixel difference D and the maximum pixel difference MAX_DIFF set in advance are compared, and when the pixel difference D is not more than the maximum pixel difference MAX_DIFF, it is determined that the pixel difference is within a predetermined range, and the procedure advances to step S5, and when otherwise, it is determined that the pixel difference is not within the predetermined range, the procedure advances to step S7.

Step S5:
To select the reference block in which the pixel difference is the least for the processing block, the Dmin storing the reference pixel difference and the pixel difference D obtained in step S3 are compared, and in case the pixel difference D is smaller than the smallest pixel difference Dmin, it is determined that the pixel difference between the reference block r and the processing block is smaller, and the procedure advances to step S6, and when otherwise, it is determined that the reference block r is not the smallest in the pixel difference with the processing block, and the procedure advances to step S7.

Step S6:
The variable r for maintaining the reference block number, in which the pixel difference with the processing block becomes the smallest, is stored with the reference block r, and the smallest pixel difference Dmin is stored with the pixel difference D with the processing block and the reference block r obtained at step S3.

Step S7:
The reference block number r is added with 1, and according to the sequential order of the template 78-3 such as, for example, FIG. 20, the next reference block is selected.

Step S8:
The reference block number r and the number of reference blocks REF_NUM are compared, and in case the reference block number r is below the number of reference blocks REF_NUM, the selection processing is taken as not completed for the entire reference blocks, and the procedure returns to step S2, and when otherwise, it is determined that the processing is completed for the entire reference blocks, and the procedure advances to step S9.

Step S9:
Whether or not s is larger than 0, that is, whether or not the reference block number selected by r is stored or not is confirmed, and in case s is larger than 0, it is determined that the reference block is selected, and the procedure advances to step S10, and in case s is 0, it is determined that the reference block is not selected, and the procedure advances to step S11.

Step S10:
In addition to outputting the fact that the reference block exists, the selected reference block number s is outputted, and the reference block selection processing is completed.

Step 11
By outputting the fact that the reference block does not exists, the reference block selection processing is completed.

By the above described processing, the reference block, which is the smallest in the pixel difference for the processing block at step S4 of FIGS. 15 and 16 and is below a predetermined number of pieces in the pixel difference, can be selected. Here, summing up a selection criteria of the reference block in FIG. 20, whether or not the reference block should be made an object of the exclusive-OR (XOR) is determined by two stages. In the first stage, where the encoding efficiency by the exclusive-OR (XOR) is not improved in case the reference block is all in white pixels or all in black pixels, such a reference block is not selected as a reference block. In the second stage, from the relation of the pixel values of the processing block and the reference block, for example, in case FIG. 22 is shown as an example, since the number of pixels after the exclusive-OR (XOR) becomes high, that is, in the case of the combination where the difference of the pixel becomes large, the improvement of the encoding efficiency cannot be expected, and therefore, the reference block is not made an object of the exclusive-OR (XOR). FIG. 22A is the case where, while a processing block 102 changes from white to black in the main scan direction, a reference block 104 changes in reverse from black to white, and a reference block 106 is vertical-striped in white and black, and a reference block 108 is an all black image. Further, FIG. 22B is the case where, while a processing block 110 of FIG. 22B changes from black to white in a peripheral scan direction, a reference block 112 changes in reverse from white to black, and a reference block 114 is vertical-stripped, and moreover, a reference block 116 is an all black image. Further, FIG. 22C is the case where, while a processing block 118 is an all black image, a reference block 120 is vertical-stripped, and a reference block 122 changes from a white to a black image, and a reference block 124 changes from a black to a white image. In each case, when the exclusive-OR (XOR) is performed with the processing block and the reference block, the number of pixels after the processing ends up being increased, and consequently, when this relation exists, the reference block is not selected as an object of the exclusive-OR (XOR).

Figure 21:
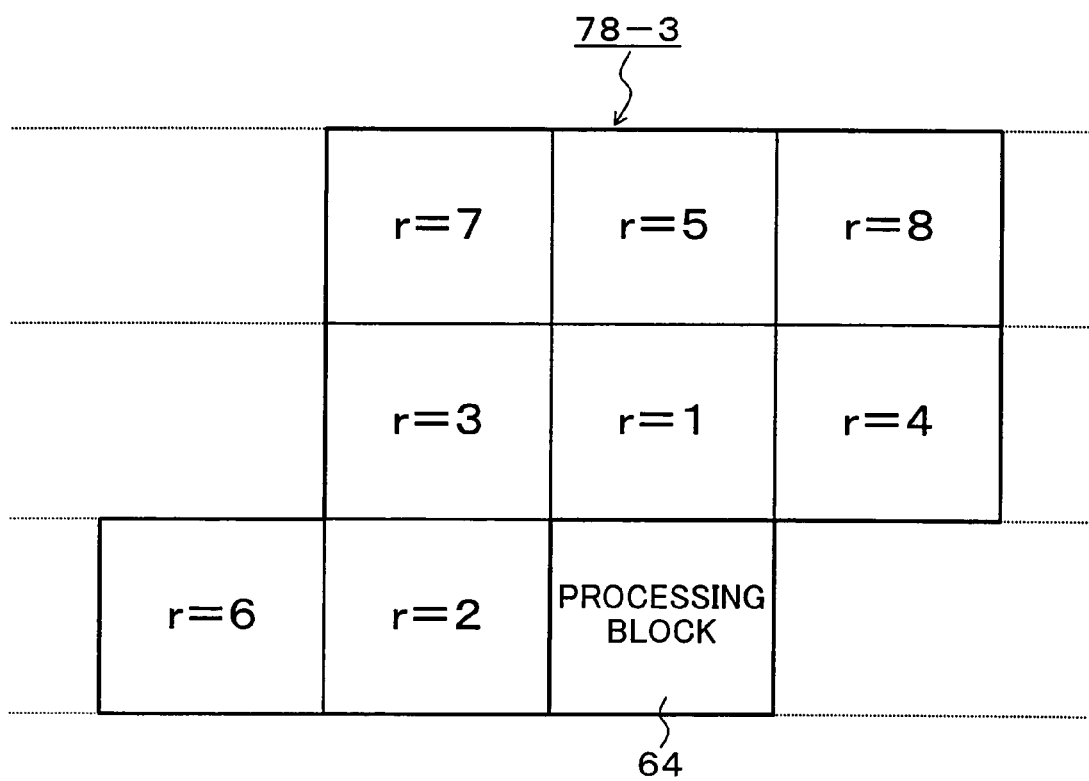
FIG. 21 is an explanatory drawing of the template designating the selection sequential order used in the reference block selection processing of FIG. 20.
Figure 23A:
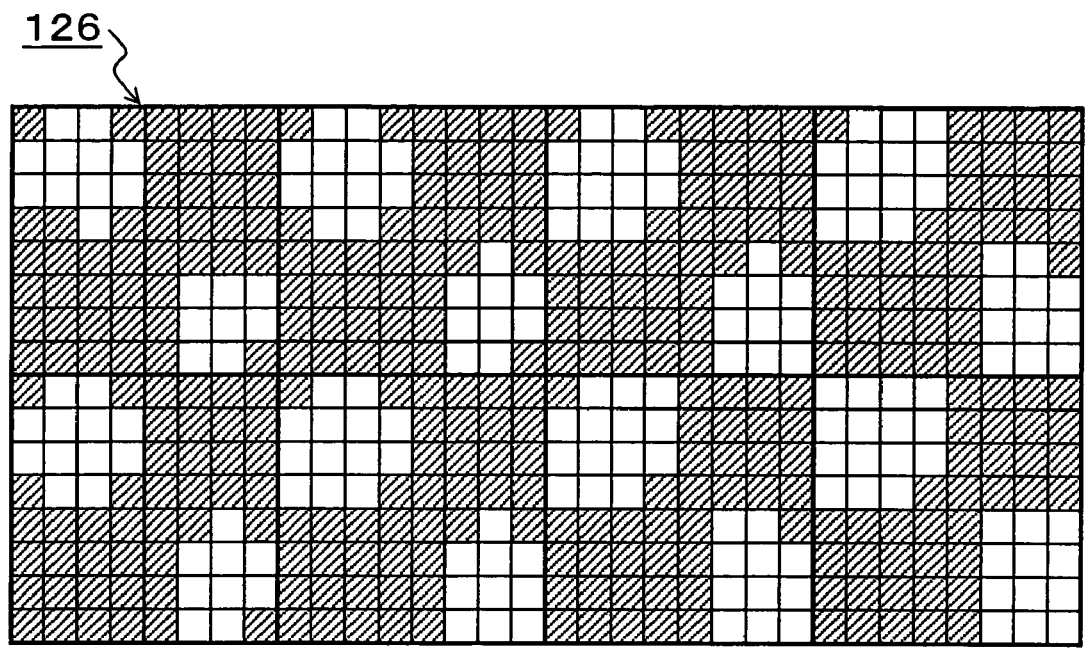
FIGS. 23A-23B are explanatory drawings of an example of the image processing in which the exclusive-OR processing according to the present invention is executed.
Figure 23B:
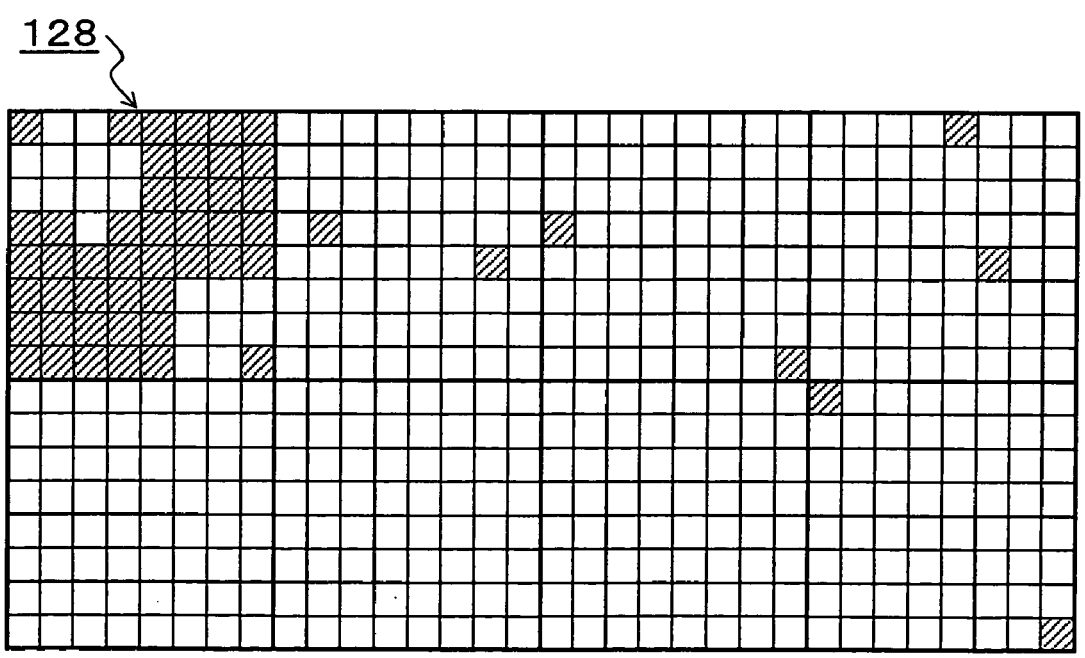

FIG. 23 is a specific example of the processing image subjected to the exclusive-OR (XOR) of the block by the present invention. FIG. 23A is an input image 126, which is resolved into blocks of horizontal and longitudinal pixels (M×N)=8×8, and after that, selects the reference block according to the sequential order of the same template 78-3 as FIG. 21 with respect to the processing block according to the processing order of FIG. 11, and executes the exclusive-OR (XOR), thereby generating a XOR processing image 128 of FIG. 23B.

Figure 24A:
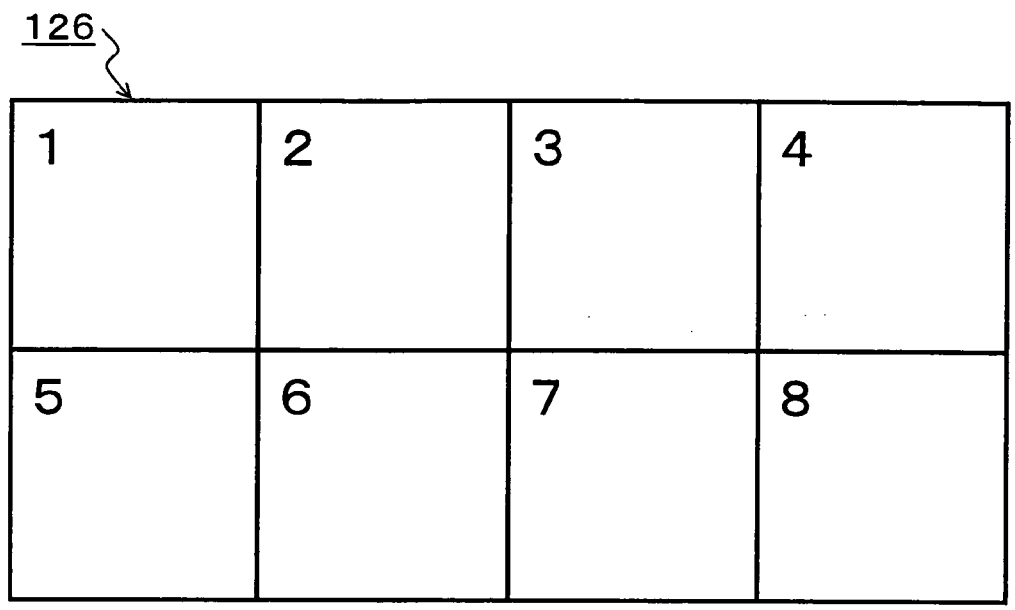
FIGS. 24A-24B are explanatory drawings of the corresponding relation between the block in which the exclusive-OR is taken in FIG. 23 and the reference block.
Figure 24B:
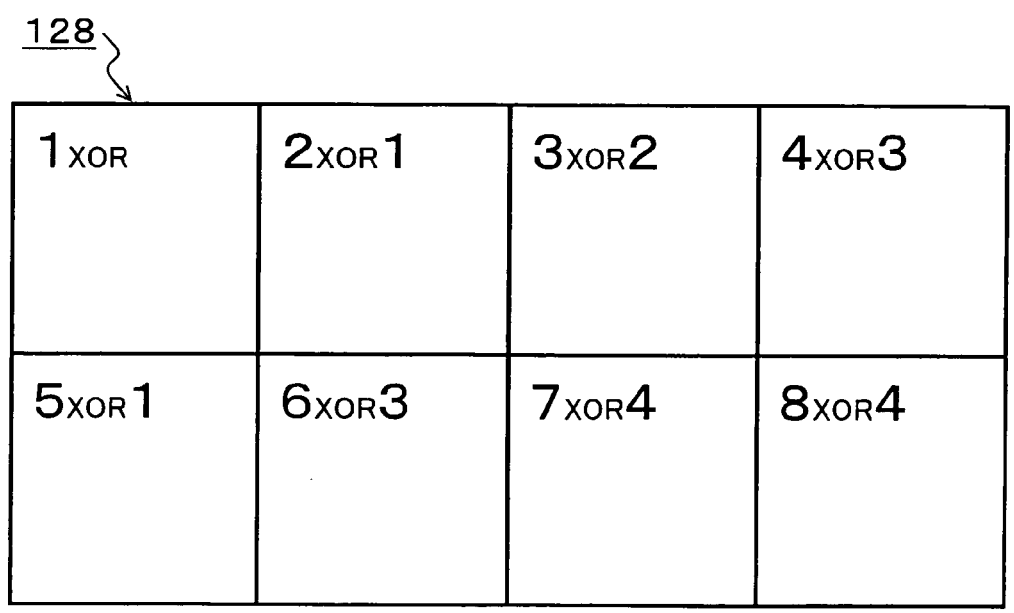

Here, FIG. 24A shows the block numbers 1 to 8 where the input image 126 of FIG. 23A is divided into blocks. Further, FIG. 24B shows the block number of the reference block selected when generating the XOR processing image 128 of FIG. 23B as a value of the right side of the XOR for the processing block number.

As evident from such XOR processing image 128 of FIG. 23B, for the block of the beginning head, there is no block available which is already processed, and therefore, the pixel of the input image 126 is disposed as it is, but as for the block subsequent to No. 2 block, it becomes the block image by the arrangement of the differential image reduced sharply in the number of black pixels by the XOR processing with the reference block. Particularly, with respect to three blocks of Nos. 5, 6, and 7, by the exclusive-OR (XO R) with the reference block Nos. 1, 3, and 4, the pixel arrangement of both the blocks is identical, and therefore, they become all white images. With respect to the dither image where the pattern form such as FIG. 23A continuously changes, it will be appreciated that the compression of performing the XOR processing according to the present invention can perform effectively high compression.

Figure 25:
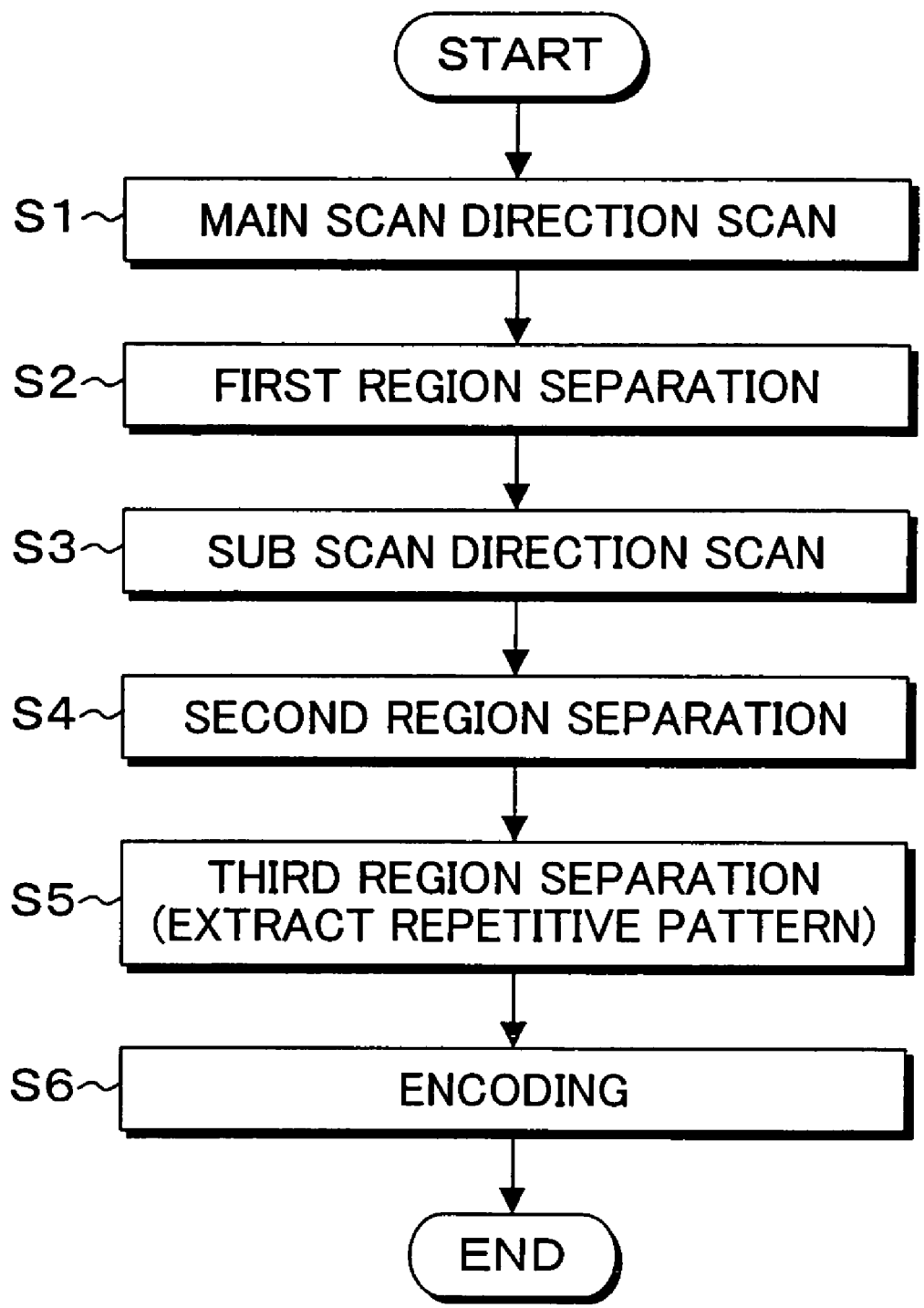
FIG. 25 is a flowchart of an encoding processing of encoding the image which is subjected to the exclusive-OR processing.

FIG. 25 is a flowchart of the encoding process of encoding the image having finished the exclusive-OR (XOR) performed by the image encoding unit 28 provided in the image compression unit 16 following the pre-processing unit 15 of FIG. 2. This encoding processing, that is, an encoding processing according to Japanese Patent Application Laid-Open No. 2001-388931 already proposed by the present inventor is as follows.

Step S1:
The image having finished the inputted exclusive-OR (XOR) is scanned in a horizontal direction (main scan direction scan) in a unit of the predetermined number of integers K.

Step S2:
A continuous blank line such as a line space and a region otherwise are separated as a logical line (first region separation).

Step S3:
A separated logical line is vertically scanned in a unit of one line (sub scan direction scan).

Step S4:
The image having finished the exclusive-OR (XOR) is separated into a blank region not including a black image such as a character space and a region including a black image other than the blank region (second region separation).

Step S5:
The repetitive pattern having the same width and the same pixel value which repeatedly appears continuously based on the region separation result is separated (third region separation).

step S6:
Each region separated at steps S2, S4, and S5 is encoded as an element.

Figure 26:
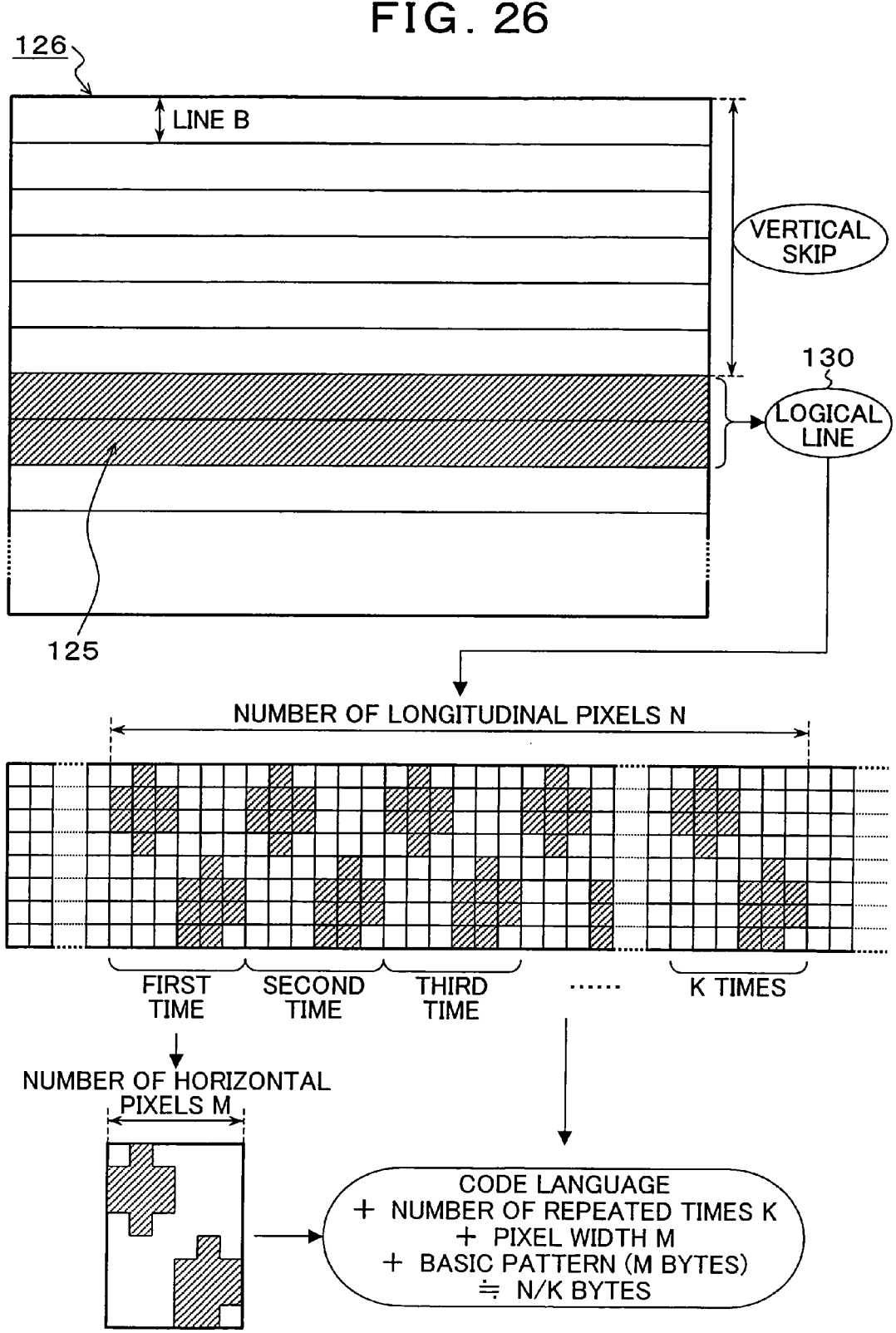
FIG. 26 is an explanatory drawing of the image compression by the encoding of FIG. 25.

FIG. 26 shows a principle of the encoding processing in FIG. 26. In FIG. 26, the pattern which repeatedly appears continuously from among logical lines 130 in the input image 126 which becomes a processing object is detected and encoded by using the length of the repetitive pattern which is the base of the repetition, the pixel value and the number of repetition times, thereby reducing a code data size. In this way, the code data comprises a code language, the number of repetition times K, a pixel width M, and a basic pattern of repetitive pattern (M bytes). In FIG. 26, though the dither pattern repeating the same ordinary pattern as the input image 126 is taken as an example, in the present invention, the XOR processing image 128 such as, for example, FIG. 23B is targeted as this input image 126, and for such XOR processing image 128, the encoding processing of FIG. 25 is performed as the encoding processing of the second stage, so that the image data can be further compressed. Further, in the encoding processing of FIG. 26, instead of outputting the detected repetitive pattern as a code data as it is, it is compressed by the compression method such as a run-length coding, thereby a code data size can be further reduced.

Figure 27:
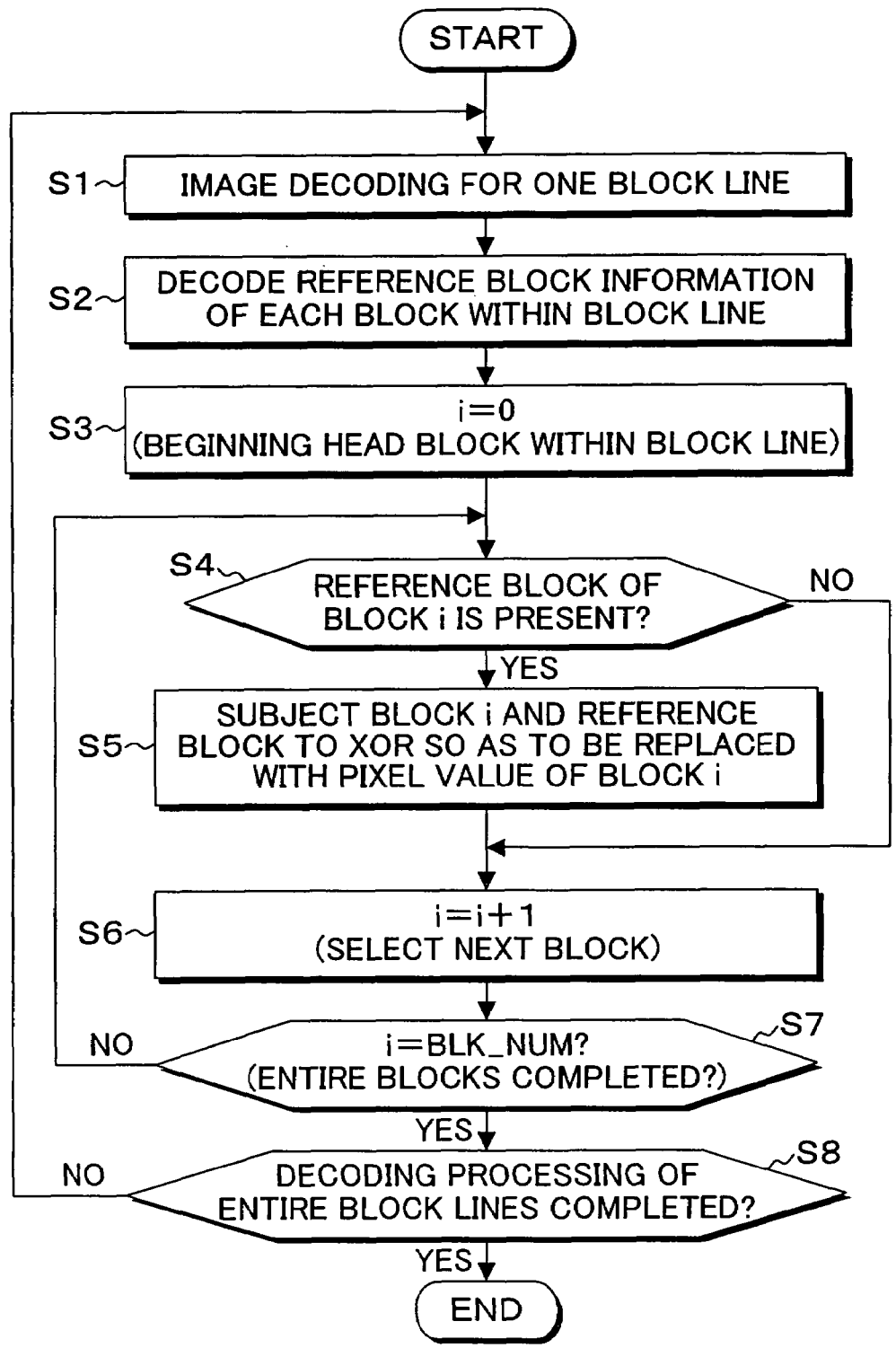
FIG. 27 is a flowchart of the image restoration processing according to the present invention.

FIG. 27 is a flowchart of the image restoration processing in the image restoration apparatus 40 of FIG. 6. This image restoration processing is a processing in which an original image data from the code data compressed for every block by the image compressing processing of FIGS. 15 and 16 is decoded, and the original image is restored in order of the blocks shown in FIG. 11. The processing procedure of this image restoration processing is as follows.

Step S1:
An image for one block line is decoded.

Step S2:
The reference block number of each block within the decoded block line, that is, the presence or absence and the position of the reference block is decoded.

Step S3:
The first block of the restored block line is selected, and i showing the block number is set with 0.

Step S4:
The presence or absence of the reference block for the block i within the block line is identified with reference to the reference block information decoded at step S2, and in case there exists the reference block, the procedure advances to step S5, and in case there exists no reference block, the procedure advances to step S6.

Step S5:

The pixel values of the block i within the block line and the reference block are subjected to the exclusive-OR (XOR), and the pixel value obtained by the exclusive-OR (XOR) is replaced with the pixel value of the block i.

Step S6:

The next block is selected within the block line, and a variable i showing the block number is added with 1.

Step S7:

The block number i and the number of blocks BLK_NUM within the block line are compared, and when matched, it is determined that the restoration of the entire blocks within the block line is completed, and the procedure advances to step S8, and when not matched, it is determined that the block not finishing the restoration still remains, and the procedure returns to step S4.

Step S8:

In case the decoding processing of the entire block lines is completed, the decoding processing is completed, and in case it is not completed, the procedure returns to step S1.

Here, whether or not the decoding processing of the entire block lines at step S8 is completed may be determined by a method of counting the number of blocks decoded or by a method of determining by a code showing the completion. In case the number of decoded blocks is counted and the completion of the processing is determined, the number of block lines is attached to the beginning head of the code data at the compression side, and in case the determination is made by a code showing the completion, it can be realized by attaching a code showing the completion to the last end of the code data.

While the above described embodiment takes as an example the case where a binary bit mapped-data is compressed and transferred to the printer side connected to the personal computer and is restored and printed at the printer side, the present invention is not limited to this, but can be applied as it is to an adequate object such as, for example, a facsimile which transfers the binary mapped data. Further, the present invention includes adequate modifications not harming the object and advantages thereof, and moreover, is not subjected to the limit by the numerical value shown in the above described embodiment.

INDUSTRIAL APPLICABILITY

As described above, according to the compression method of the bit-mapped image and the restoration method program and the apparatus of the present invention, an image is divided into in a unit of block and an exclusive-OR (XOR) is performed with neighborhood blocks, so that the number of black pixels which become the coding objects inside the image is reduced, and the compression efficiency of the image can be improved.

Further, by combining the compression method in which a region including the black pixels and a region otherwise are separated by scanning in a main scan direction and a sub scan direction so as to encode them as elements, the height of the block to perform the exclusive-OR(XOR) is made integer times the number of lines scanned in the main scan direction in this compression method, so that the compressibility can be still further improved. As a result, the compressibility of the dither image, in which the pattern continuously changes similarly to the gradation, can be enhanced, and by applying the method to the printed image, a transferring time to the printer is sharply shortened, thereby contributing greatly to the improvement of the printing speed.

What is claimed is:

1. An image compression method, comprising:
   dividing an input image into blocks having a predetermined number of horizontal and longitudinal pixels;
   selecting in order the divided blocks as a processing block by scanning the divided blocks in a main scan direction and in a sub scan direction; and
   for each processing block,
      selecting, as a corresponding reference block, a block in which a positional relation with the processing block and a relation of a pixel value satisfies a predetermined condition for selecting the reference block;
      generating a differential image by subjecting pixel values of the processing block and the corresponding reference block to an exclusive-OR, and
      replacing the processing block with the differential image when the differential image satisfies a predetermined condition for replacing the processing block.

2. The image compression method according to claim 1, further comprising:
   encoding an image obtained by executing said replacing; and
   combining and outputting code data obtained by executing said encoding data indicating presence or absence of replacement with the differential image of each processing block obtained by executing said replacing, and positional information of the reference block.

3. The image compression method according to claim 1, wherein said selecting, as a corresponding reference block, preferentially selects as the reference block a block close to the current processing block from among the blocks already selected and processed by said selecting in order.

4. The image compression method according to claim 1, wherein said replacing does not perform the replacement with the differential image of the processing block when a pixel difference between the processing block and the corresponding reference block is equal to or not less than a predetermined number of pieces based on the result of executing said generating.

5. The image compression method according to claim 1, wherein said selecting in order skips the exclusive-OR with the corresponding reference block of the processing block when pixel value of the processing block matches a predetermined pattern set in advance.

6. The image compression method according to claim 1, wherein said dividing takes the number of horizontal pixels and the number of longitudinal pixels as a multiple of eight.

7. The image compression method according to claim 2, wherein said encoding comprises:
   separating the image into a region including black pixels in a unit of line K which is an arbitrary integer and a region not including black pixels by scanning in a main scan direction;
   separating a logical line defined as N line which is integer times the K including the black pixels obtained by said separating the image into a region including black pixels in a unit of one line and a region not including black pixels by scanning in a sub scan direction crossing the main scan direction; and encoding each region obtained by said separating the image and said separating a logical line as an element.

8. An image restoration method, comprising:
inputting code data of an image divided into blocks that have been processed as processing blocks;
inputting data indicating presence or absence of replacement of the processing blocks with differential images generated by using reference blocks;
inputting positional information of the reference blocks;
decoding the inputted code data into an image;
dividing the decoded image into the processing blocks, and
subjecting pixel values of each processing block that has been replaced with a differential image, as indicated by the inputted data indicating presence or absence of replacement of the processing blocks with differential images, to an exclusive-OR with a reference block used to generate the differential image, in accordance with the inputted positional information.

9. The image restoration method according to claim 8, wherein the data indicating presence or absence, and the positional information, are generated by processing of a compression side comprising:
dividing an input image into blocks having a predetermined number of horizontal and longitudinal pixels;
selecting in order the divided blocks as a processing block by scanning the divided blocks in a main scan direction and in a sub scan direction; and
for each processing block,
selecting, as a corresponding reference block, a block in which a positional relation with the processing block and a relation of a pixel value satisfies a predetermined condition for selecting the reference block,
generating a differential image by subjecting pixel values of the processing block and the corresponding reference block to an exclusive-OR, and
replacing the processing block with the differential image when the differential image satisfies a predetermined condition for replacing the processing block.

10. The image restoration method according to claim 8, wherein the code data is generated by processing at a compression side comprising:
separating the image
separating the image into a region including black pixels and a region not including black pixels in a unit of line K which is an arbitrary integer by scanning in a main scan direction;
separating a logical line defined as N line which is integer times the K including the black pixels, obtained by said separating the image, into a region including black pixels and a region not including black pixels in a unit of one line by scanning in a sub scan direction crossing the main scan direction; and
encoding each region obtained by said separating the image and by said separating a logical line.

11. A computer program on a computer readable medium, the computer program allowing a computer to execute:
dividing an input image into blocks having a predetermined number of horizontal and longitudinal pixels;
selecting in order the divided blocks as a processing block by scanning the divided blocks in a main scan direction and in a sub scan direction; and
for each processing block,
selecting, as a corresponding reference block, a block in which a positional relation with the processing block and a relation of a pixel value satisfies a predetermined condition for selecting the reference block,
generating a differential image by subjecting the pixel values of the processing block and the corresponding reference block to an exclusive-OR, and
replacing the processing block with the differential image when the differential image satisfies a predetermined condition for replacing the processing block.

12. A computer program on a computer-readable medium, the computer program allowing a computer to execute:
inputting code data of an image divided into blocks that have been processed as processing blocks;
inputting data indicating presence or absence of replacement of the processing blocks with the differential images generated by using reference blocks;
inputting positional information of the reference blocks;
decoding the inputted code data into an image;
dividing the decoded image into the processing blocks;
subjecting pixel values of each processing block that has been replaced with a differential image, as indicated by the inputted data indicating presence or absence of replacement of the processing blocks with differential images, to an exclusive-OR with a reference block used to generate the differential image, in accordance with the inputted positional information.

13. An image compression apparatus, comprising:
a block dividing unit dividing an input image into blocks having a predetermined number of horizontal and longitudinal pixels;
a processing block selecting unit of-selecting in order the divided blocks as a processing block by scanning the divided blocks in a main scan direction and in a sub scan direction; and
a reference block selecting unit selecting, for each processing block, as a corresponding reference blocks a block in which a positional relation with the processing block and a relation of a pixel value satisfies a predetermined condition for selecting the reference block;
a differential image generating unit generating, for each processing block, a differential image by subjecting the pixel values of the processing block and the corresponding reference block to an exclusive-OR;
a block replacing unit replacing, for each processing block, the processing block with the differential image when the differential image satisfies a predetermined condition for replacing the processing block, to thereby obtain an image;
an image encoding the image obtained by the block replacing unit, to thereby obtain code data; and
a coding outputting unit outputting the code data, data indicating presence or absence of replacement with the differential image of each processing block, and positional information of the reference blocks.

14. An image restoration apparatus, comprising:
a code inputting unit inputting
code data of an image divided into blocks that have been processed as processing blocks,
data indicating presence or absence of replacement of the processing blocks with differential images generated by using reference blocks, and
positional information of the reference blocks;
an image decoding unit decoding the inputted code data into an image; and a block decoding unit dividing the decoded image into the processing blocks, and subjecting pixel values of each processing block that has been replaced with a differential image, as indicated by the inputted data indicating presence or absence of replacement of the processing blocks with differential images, to an exclusive-OR with a reference block used to generate the differential image, in accordance with the inputted positional information.

15. An image compression method for compressing an image divided into blocks, comprising, for each respective block:
   selecting, as a corresponding reference block, a block in which a positional relation with said respective block and a relation of a pixel value satisfies a predetermined condition for selecting the reference block,
   generating a differential image by subjecting pixel values of said respective block and the corresponding reference block to an exclusive-OR, and
   replacing said respective block with the differential image when the differential image satisfies a predetermined condition for replacing said respective block.

16. An image compression apparatus for compressing an image divided into blocks, comprising, for each respective block:
   means for selecting, as a corresponding reference block, a block in which a positional relation with said respective block and a relation of a pixel value satisfies a predetermined condition for selecting the reference block,
   means for generating a differential image by subjecting pixel values of said respective block and the corresponding reference block to an exclusive-OR, and
   means for replacing said respective block with the differential image when the differential image satisfies a predetermined condition for replacing said respective block.

* * * * *

UNITED STATES PATENT AND TRADEMARK OFFICE
CERTIFICATE OF CORRECTION

PATENT NO. : 7,236,636 B2  Page 1 of 1
APPLICATION NO. : 11/038603
DATED : June 26, 2007
INVENTOR(S) : Kenichiro Sakai et al.

It is certified that error appears in the above-identified patent and that said Letters Patent is hereby corrected as shown below:

Col. 20, line 18, delete "block;" and insert --block,--, therefor.

Col. 21, line 45, delete "separating the image".

Col. 22, line 32, delete "of-selecting" and insert --selecting--, therefor.

Col. 22, line 37, delete "blocks" and insert --block--, therefor.

Signed and Sealed this

Twentieth Day of November, 2007

JON W. DUDAS
*Director of the United States Patent and Trademark Office*